(12) United States Patent
Shinohara et al.

(10) Patent No.: US 7,372,486 B2
(45) Date of Patent: May 13, 2008

(54) PHOTOGRAPHING APPARATUS AND METHOD OF ADJUSTING AN IMAGE OF A PHOTOGRAPHING OBJECT

(75) Inventors: Junichi Shinohara, Yokohama (JP); Kenji Shiraishi, Yokohama (JP); Tomoya Kitajima, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 740 days.

(21) Appl. No.: 10/270,314

(22) Filed: Oct. 15, 2002

(65) Prior Publication Data
US 2003/0071911 A1    Apr. 17, 2003

(30) Foreign Application Priority Data
Oct. 15, 2001    (JP) ............................. 2001-316328

(51) Int. Cl.
H04N 5/262    (2006.01)
H04N 5/232    (2006.01)

(52) U.S. Cl. ............................. 348/240.99; 348/240.1; 348/211.9

(58) Field of Classification Search ........... 348/240.99, 348/211.9
See application file for complete search history.

(56) References Cited

U.S. PATENT DOCUMENTS

| | | |
|---|---|---|
| 4,441,801 A * | 4/1984 | Mashimo et al. ........... 396/406 |
| 4,506,965 A | 3/1985 | Kitajima et al. |
| 4,653,885 A | 3/1987 | Araki et al. |
| 4,720,720 A | 1/1988 | Araki et al. |
| 4,922,281 A | 5/1990 | Kitajima |
| 4,947,202 A | 8/1990 | Kitajima et al. |
| 5,069,543 A | 12/1991 | Kitajima et al. |
| 5,070,356 A | 12/1991 | Nakamura et al. |
| 5,150,143 A | 9/1992 | Ohno et al. |
| 5,192,860 A | 3/1993 | Shinohara et al. |
| 5,192,964 A | 3/1993 | Shinohara et al. |
| 5,270,755 A | 12/1993 | Ohno et al. |
| 5,293,034 A | 3/1994 | Ohno et al. |

(Continued)

FOREIGN PATENT DOCUMENTS

JP    11-112865    4/1999

(Continued)

OTHER PUBLICATIONS

U.S. Appl. No. 09/986,880, filed Nov. 13, 2001, pending.

(Continued)

*Primary Examiner*—Lin Ye
*Assistant Examiner*—Hung H. Lam
(74) *Attorney, Agent, or Firm*—Oblon, Spivak, McClelland, Maier & Neustadt, P.C.

(57) ABSTRACT

A photographing object image adjusting apparatus including a plurality of adjusting operation devices corresponding to a plurality of object image adjusting modes, respectively, and an object image adjusting device. Each of the plurality of adjusting operation devices is configured such that an adjusting operation giving an instruction of object image adjusting is performed by being manipulated. The object image adjusting device is configured to adjust an image of an object imaged on an imaging surface of a photographing element in an object image adjusting mode of the plurality of object image adjusting modes corresponding to an adjusting operation device of the plurality of adjusting operation devices in which the adjusting operation giving the instruction of object image adjusting has been performed.

10 Claims, 17 Drawing Sheets

U.S. PATENT DOCUMENTS

| | | | |
|---|---|---|---|
| 5,309,190 A | | 5/1994 | Shinohara et al. |
| 5,650,607 A | * | 7/1997 | Kusaka .................... 250/201.8 |
| 5,682,563 A | | 10/1997 | Shinohara et al. |
| 5,740,478 A | * | 4/1998 | Kobayashi .................. 396/121 |
| 5,802,405 A | * | 9/1998 | Sugimoto ..................... 396/82 |
| 6,246,832 B1 | * | 6/2001 | Terada ......................... 396/63 |
| 6,693,673 B1 | * | 2/2004 | Tanaka et al. .............. 348/371 |
| 7,012,641 B2 | * | 3/2006 | Kawabe .................. 348/240.2 |
| 7,103,267 B2 | * | 9/2006 | Miyake ...................... 386/117 |
| 2001/0010556 A1 | * | 8/2001 | Sugimoto et al. ........... 348/345 |
| 2001/0050718 A1 | * | 12/2001 | Ito .............................. 348/345 |
| 2003/0071911 A1 | | 4/2003 | Shinohara et al. |
| 2004/0090546 A1 | * | 5/2004 | Doron ..................... 348/240.1 |
| 2005/0104975 A1 | * | 5/2005 | Hayashi ................... 348/222.1 |

FOREIGN PATENT DOCUMENTS

| | | | |
|---|---|---|---|
| JP | 11-266388 | * | 9/1999 |
| JP | 2000-147368 | | 5/2000 |
| JP | 3604750 | | 10/2004 |
| JP | 3721904 | | 9/2005 |

OTHER PUBLICATIONS

U.S. Appl. No. 10/270,314, filed Oct. 15, 2002, Shinohara et al.
U.S. Appl. No. 10/452,050, filed Jun. 3, 2003, Kitajima et al.
U.S. Appl. No. 10/354,086, filed Jan. 30, 2003, Ojima et al.
U.S. Appl. No. 11/028,307, filed Jan. 4, 2005, Shiraishi.
U.S. Appl. No. 10/913,549, filed Aug. 9, 2004, Nuno et al.
U.S. Appl. No. 10/914,196, filed Aug. 10, 2004, Shiraishi.
U.S. Appl. No. 10/870,141, filed Jun. 18, 2004, Shinohara.
U.S. Appl. No. 10/764,438, filed Jan. 27, 2004, Shiraishi et al.
U.S. Appl. No. 10/636,712, filed Aug. 8, 2003, Shinohara et al.
U.S. Appl. No. 10/637,502, filed Aug. 11, 2003, Shiraishi.
U.S. Appl. No. 10/641,050, filed Aug. 15, 2003, Shinohara et al.
U.S. Appl. No. 10/623,556, filed Jul. 22, 2003, Shiraishi.

* cited by examiner

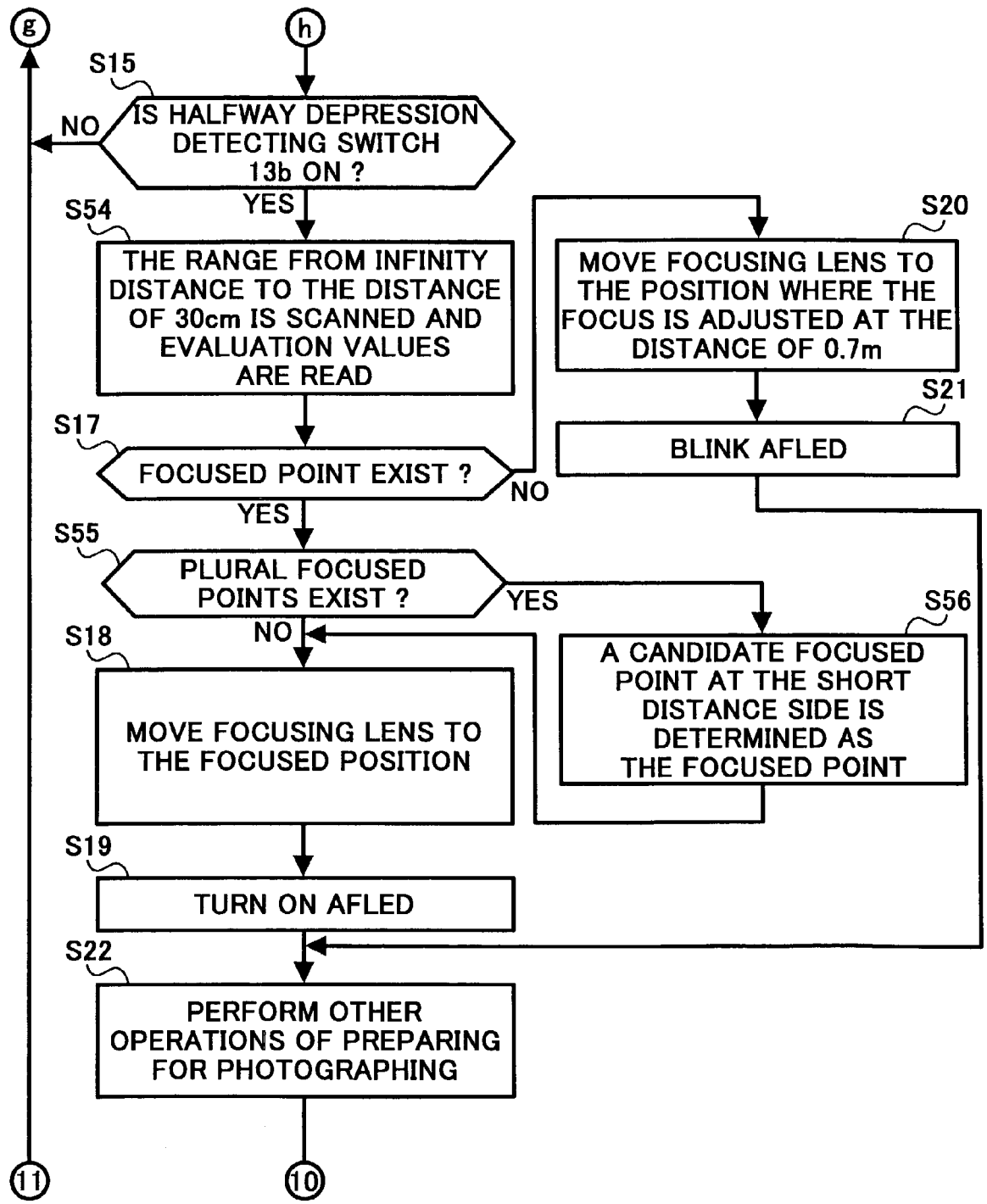

RELATION BETWEEN PHOTOGRAPHING DISTANCE AND FOCUSING LENS DRIVING AMOUNT

RELATION BETWEEN PHOTOGRAPHING DISTANCE AND FOCUSING LENS DRIVING AMOUNT

PHOTOGRAPHING APPARATUS AND METHOD OF ADJUSTING AN IMAGE OF A PHOTOGRAPHING OBJECT

BACKGROUND OF THE INVENTION

1. Field of the Invention

The present relates to a photographing object image adjusting apparatus and a photographing apparatus, and in particular to a photographing object image adjusting apparatus that performs focus and brightness adjusting for each photographing mode and a photographing apparatus having focus and brightness adjusting functions for each photographing mode.

2. Discussion of the Background

In photographing apparatuses, such as digital cameras, auto-focusing automatically adjusting the focus is performed so that an optimal image of a photographing object is imaged on an imaging surface. An auto-focusing method called a CCDAF (CCD auto-focusing) method is generally used in digital cameras. In the CCDAF method, while moving a focusing lens from the infinite distance side to the closest distance side to change the state of the focus, an image of a photographing object is imaged on an imaging surface of a CCD as a photographing element, high frequency components of image signals obtained from the CCD are sampled and evaluated, and the point where a maximum evaluation value has been obtained is determined as the focused position. A range in which a focusing lens or a CCD as a photographing element is moved for focus adjustment or auto-focusing is sometimes referred to as a scanning range for focus adjustment or auto-focusing, and the width of the range is referred to as the scanning width for focus adjustment or auto-focusing.

Driving a focus adjusting mechanism for moving a lens system or a CCD as photographing element must be controlled such that the lens system or the CCD is stopped with a resolution finer than a depth of focus, which is determined by an F-number and a focal distance of the lens system and a picture element pitch of the CCD. Otherwise, it occurs that, for example, when the lens system is out of focus at the long distance side, by generation of one pulse of a focusing motor driving the focus driving mechanism intended for putting the lens system in focus, the lens system is out of focus again, this time at the short distance side.

Generally, a focus adjusting mechanism is designed such that a lens system or a CCD as a photographing element is moved about one half of a depth of focus by one pulse of a focusing motor driving the focus adjusting mechanism. Of course, the lens system or CCD may be moved at a finer resolution from the viewpoint of performance, which, however, is disadvantageous from the viewpoint of driving time. Therefore, in this disclosure, it is assumed that a lens system or a CCD as a photographing element is moved one half of a depth of focus by one pulse of a focusing motor driving a focus adjusting mechanism for moving the lens system or the CCD.

The number of driving pulses of the focusing motor for moving the lens system or CCD for focus adjustment are calculated as illustrated in FIG. 10 and FIG. 11. The F-number and the focal distance of the lens system and the picture element pitch of the CCD are predetermined, respectively. For adjusting the focus in the range of photographing distance between infinity distance and the distance of 30 cm, for example, in a telephotographing condition, the focusing motor is driven for about 100 pulses. That is, by driving the focusing motor for this number of pulses, i.e., about 100 pulses, the lens system or CCD is moved through the whole scanning width for adjusting the focus. High frequency components of image signals obtained from the CCD in the whole scanning width are sampled and evaluated at appropriate intervals, and based upon a result of the evaluation, the focused position is determined. It is not necessary to obtain an evaluation value for each pulse of the focusing motor, and for example, an evaluation value may be obtained for every 3-4 pulses and thereafter an interpolating calculation may be performed. The length of an auto-focusing time is greatly affected by width of the whole scanning width for focus adjustment.

The whole scanning width for focus adjustment is greater as the CCD picture element pitch is finer, the F-number is brighter, the focal length is longer, or the closest photographing distance is smaller. Accordingly, in recent digital cameras, the auto-focusing time tends to be increased.

To cope with such a problem that the auto-focusing time is increased, a short distance photographing mode (hereinafter, a macro photographing mode) is often provided.

For example, in a camera having a lens system designed for photographing an object in the range of distance between infinity distance and the closest distance of 30 cm, when a normal photographing mode is selected, the photographing range is set to be between infinity distance and the distance of 60 cm, and when a macro photographing mode is selected, the photographing range is set to be between the distances of 60 cm and 30 cm. Thereby, in either of the normal photographing mode and the macro photographing mode, the whole scanning width of a range of distance in which the lens system or a CCD as a photographing element is moved for focus adjustment is reduced such that by driving a focusing motor for about 50 pulses, the lens system or CCD is moved through the whole scanning width for focus adjustment, so that the auto-focusing time is remarkably reduced.

In background cameras, selection of a normal photographing mode and a macro photographing mode is performed by manipulating a dial-type mode selection switch, which is separate from a release button with which an instruction of auto-focusing is given by a halfway depressing operation thereof. The photographer first manipulates the mode selection switch to select, for example, the normal photographing mode, and then depresses the release button halfway, and thereby auto-focusing in the normal photographing mode is performed. When the release button is halfway depressed after selecting the macro photographing mode, auto-focusing in the macro photographing mode is performed.

As described above, in the background cameras having a macro photographing mode, when photographing an object at a closest distance, before manipulating a release button, a mode selection switch must be manipulated to select the macro photographing mode, which is troublesome. In particular, when photographing moving objects, such as children, at a shorter distance, and another objects at a normal distance, at random, switching between the normal and macro photographing modes is extremely troublesome.

Further, some recent digital cameras are provided with two macro photographing modes, such as a normal macro photographing mode for photographing an object in the range of distance from 30 cm to 60 cm and a super macro photographing mode for photographing an object in the range of distance from 1 cm to 30 cm. In such digital cameras, the operation of selecting one of the photographing modes is more time consuming, leading to a problem that a photographing chance is missed.

Furthermore, in some recent cameras, in addition to the normal photographing mode and the macro photographing mode, various other photographing modes are provided, for example, a single auto-focusing mode in which an auto-focusing operation is performed only once in response to a halfway depressing operation of a release button, and a continuous auto-focusing mode in which an auto-focusing operation is performed while the release button is continued to be halfway depressed.

SUMMARY OF THE INVENTION

The present invention has been made in view of the above-discussed and other problems and addresses the above-discussed and other problems.

Preferred embodiments of the present invention provide a novel photographing object image adjusting apparatus and method that quickly images an optimal image of a photographing object on an imaging surface and a photographing apparatus using the novel photographing object image adjusting apparatus.

According to one example of the present invention, a photographing object image adjusting apparatus includes a plurality of adjusting operation devices corresponding to a plurality of object image adjusting modes, respectively, and an object image adjusting device. Each of the plurality of adjusting operation devices is configured such that an adjusting operation giving an instruction of object image adjusting is performed by being manipulated. The object image adjusting device is configured to adjust an image of a photographing object imaged on an imaging surface of a photographing element in an object image adjusting mode of the plurality of object image adjusting modes corresponding to an adjusting operation device of the plurality of adjusting operation devices in which the adjusting operation giving the instruction of object image adjusting has been performed.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Figure 1:
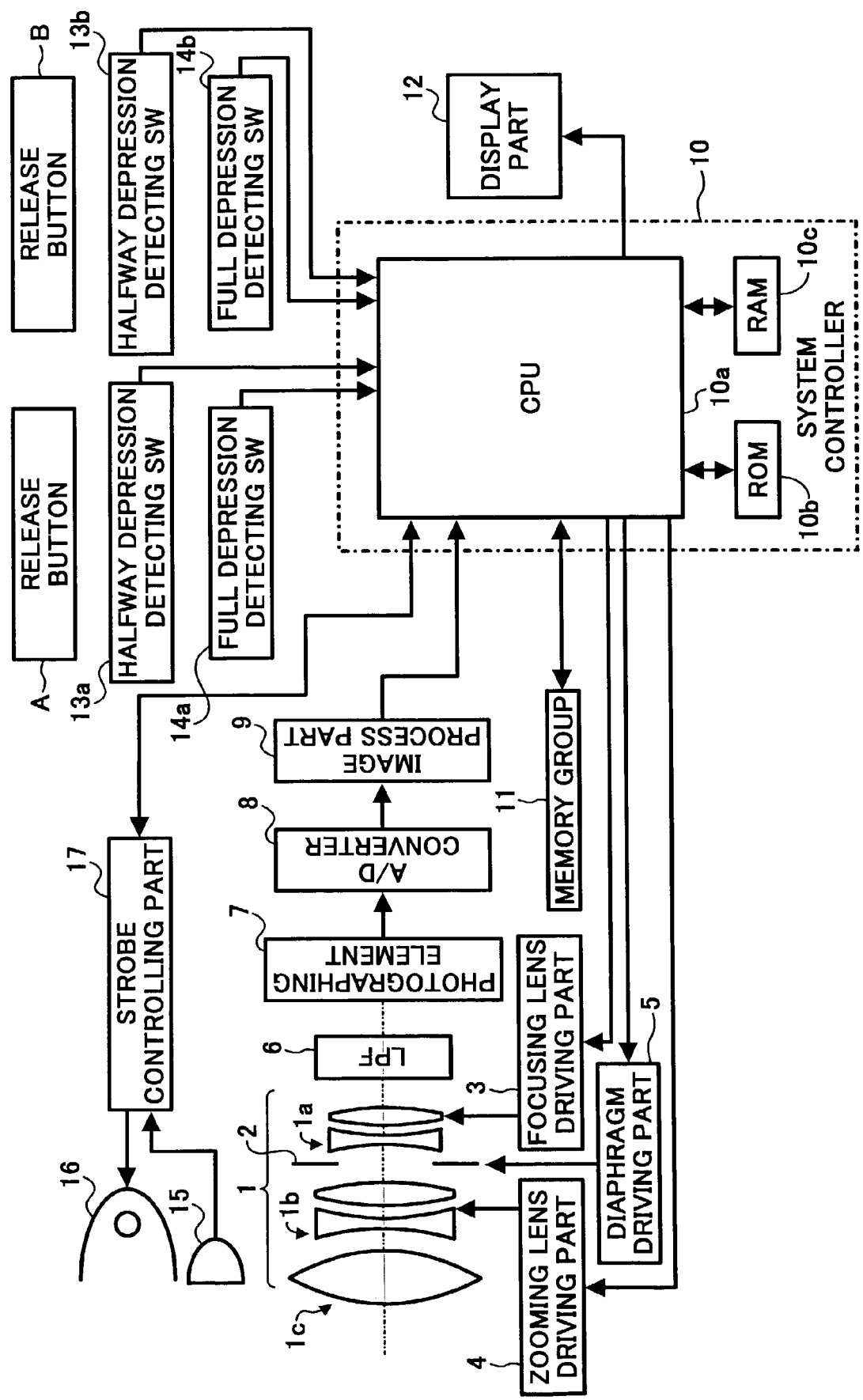
FIG. 1 is a block diagram of a digital camera as a photographing apparatus incorporating a photographing object image adjusting apparatus according to the first embodiment of the present invention.

Referring now to the drawings, wherein like reference numerals designate identical or corresponding parts throughout the several views, preferred embodiments of the present invention are described.

FIG. 1 is a block diagram of a digital camera as a photographing apparatus incorporating a photographing object image adjusting apparatus according to the first embodiment of the present invention.

As illustrated in FIG. 1, a photographing object light is first incident on an optical system 1. The optical system 1 includes a focusing lens group 1a which performs focus adjustment of an image of a photographing object by forward and backward movement thereof in the direction of an optical axis of the optical system 1, a zooming lens group 1b which performs enlargement and reduction of the photographing object image by forward and backward movement thereof in the optical axial direction, and an imaging lens group 1c which forms, in cooperation with the focusing lens group 1a and the zooming lens group 1b, the photographing object image on a photographing surface described later.

A diaphragm 2 is arranged between the focusing lens group 1a and the zooming lens group 1b, and the light quantity incident on the focusing lens group 1a is regulated by the diaphragm 2. The focusing lens group 1a is driven by a focusing lens driving part 3, the zooming lens group 1b is driven by a zooming lens driving part 4, and the diaphragm 5 is driven by a diaphragm driving part 5, respectively.

A photographing object light passed the optical system 1 is incident on a photographing element 7 as a photographing device via a low-pass filter (LPF) 6 eliminating high frequency components of the light. The photographing element 7 includes a photographing surface serving as an imaging surface, in which a plurality of picture elements performing photoelectrical conversion are arranged in a form of a two-dimensional matrix. When a photographing object light is incident on the photographing element 7, an image of a photographing object formed on the photographing surface of the photographing element 7 is converted to electrical signals, so that image data of the photographing object is outputted.

Image data outputted by the photographing element 7 is converted to digital values by an A/D converter 8 to be outputted to an image processing part 9. The image processing part 9 performs various image processes to the image data, such as compression/decompression of the image data, conversion of a resolution, etc., and outputs the processed image data to a system controller 10.

The system controller 10 controls the whole part of the digital camera, and includes a CPU 10a performing various calculations according to programs, a ROM 10b as a read-only memory storing the programs, and a RAM 10c as a read/write memory having a working area which is used when various processes are performed by the CPU 10a and a data storage area for storing various data. The CPU 10a, the ROM 10b, and the RAM 10c are connected with each other by a bus line (not illustrated).

The focusing lens driving part 3, the zooming lens driving part 4, and the diaphragm driving part 5 are connected with the system controller 10. Further, a memory group 11 including memories for storing image data outputted by the image processing part 9, and a display part 12 including a liquid display for displaying image data and an LED for indicating if focus adjustment has been successful (hereinafter AFLED) are connected with the system controller 10. The system controller 10 controls the operations of the focusing lens driving part 3, the zooming lens driving part 4, the diaphragm driving part 5, the memory group 11, and the display part 12.

Two release buttons are provided to the digital camera, release buttons A and B, serving as adjusting operation devices for giving an instruction of adjusting an image of a photographing object imaged on the imaging surface of the photographing element 7 and photographing operation devices for giving an instruction of photographing the photographing object image. Each of the release buttons A and B gives an instruction of adjusting an image of a photographing object when a halfway depressing operation thereof is performed by the photographer, and an instruction of photographing the photographing object image when a full depressing operation thereof is performed. The release button A is provided corresponding to a normal photographing mode for photographing a photographing object at a long distance, and the release button B is provided corresponding to a macro photographing mode for photographing a photographing object at a short distance.

The digital camera further includes a halfway depression detecting switch 13a which is activated when the release button A is halfway depressed, a full depression detecting switch 14a which is activated when the release button A is fully depressed, a halfway depression detecting switch 13b which is activated when the release button B is halfway depressed, and a full depression detecting switch 14b which is activated when the release button B is fully depressed. These detecting switches 13a, 14a, 13b and 14b are connected with the system controller 10.

The digital camera further includes a strobe light receiving part 15 which measures brightness of a photographing object, a strobe light emitting part 16 emitting a light for illuminating a photographing object, and a strobe controlling part 17 which determines whether to illuminate a photographing object based on brightness of the photographing object measured by the strobe light receiving part 15 and which, according to a result of the determination, controls light emission of the strobe light emitting part 16. The strobe controlling part 17 outputs the result of the determination to the system controller 10.

Figure 2:
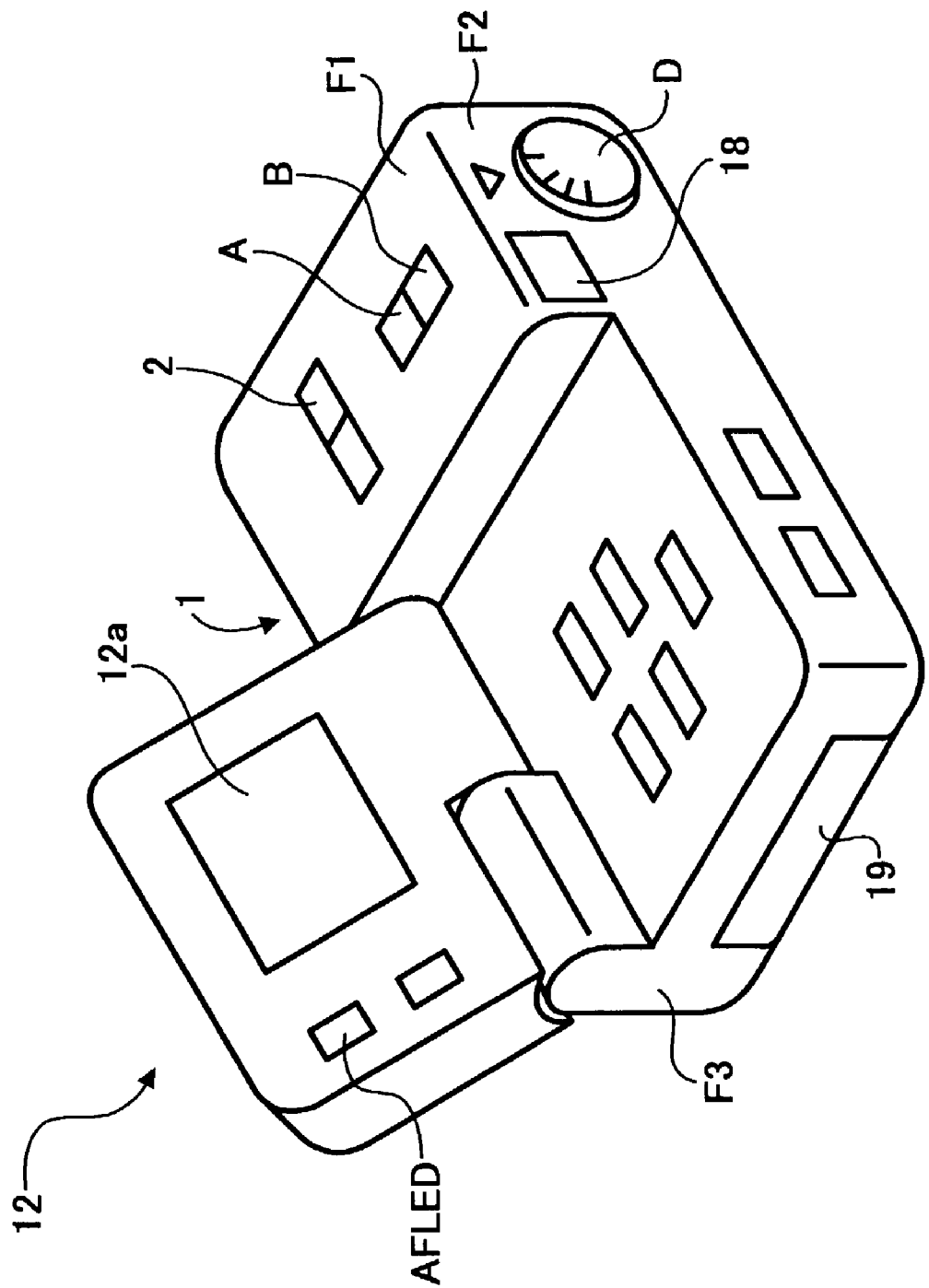
FIG. 2 is a schematic drawing of an outer appearance of the digital camera.

FIG. 2 illustrates an exemplary outer appearance of the above-described digital camera. As illustrated in FIG. 2, the release buttons A and B are provided on an upper surface F1 of an accommodating case accommodating the above-described units 1-17 so as to be arranged in succession in that order from the side of a side surface of the accommodating case where an opening of the optical system 1 is provided toward an opposing side surface F2. That is, the release button B to be operated in the macro photographing mode is positioned at the side of the opposing side surface F2, i.e., at the side of the photographer. A zooming button 2, which, when depressed, gives an instruction of enlargement or reduction of an image of a photographing object, is also arranged on the upper surface F1. A liquid display 12a of the display part 12 displays photographed images and menu screens. The AFLED of the display part 12 indicates if focus adjustment has been successful as described above.

A mode dial D for giving an instruction of switching of various operation modes, such as a photographing mode for photographing a photographing object, a reproducing mode for displaying image data of a photographed image on the liquid display 12a, a transferring mode for transferring image data of a photographed image to a personal computer, etc., and a finder 18 are also provided to the side surface F2. Further, an inlet 19 for inserting a detachable recording medium for storing image data of a photographed image is provided to a side surface F3 of the accommodating case.

Figure 3A:
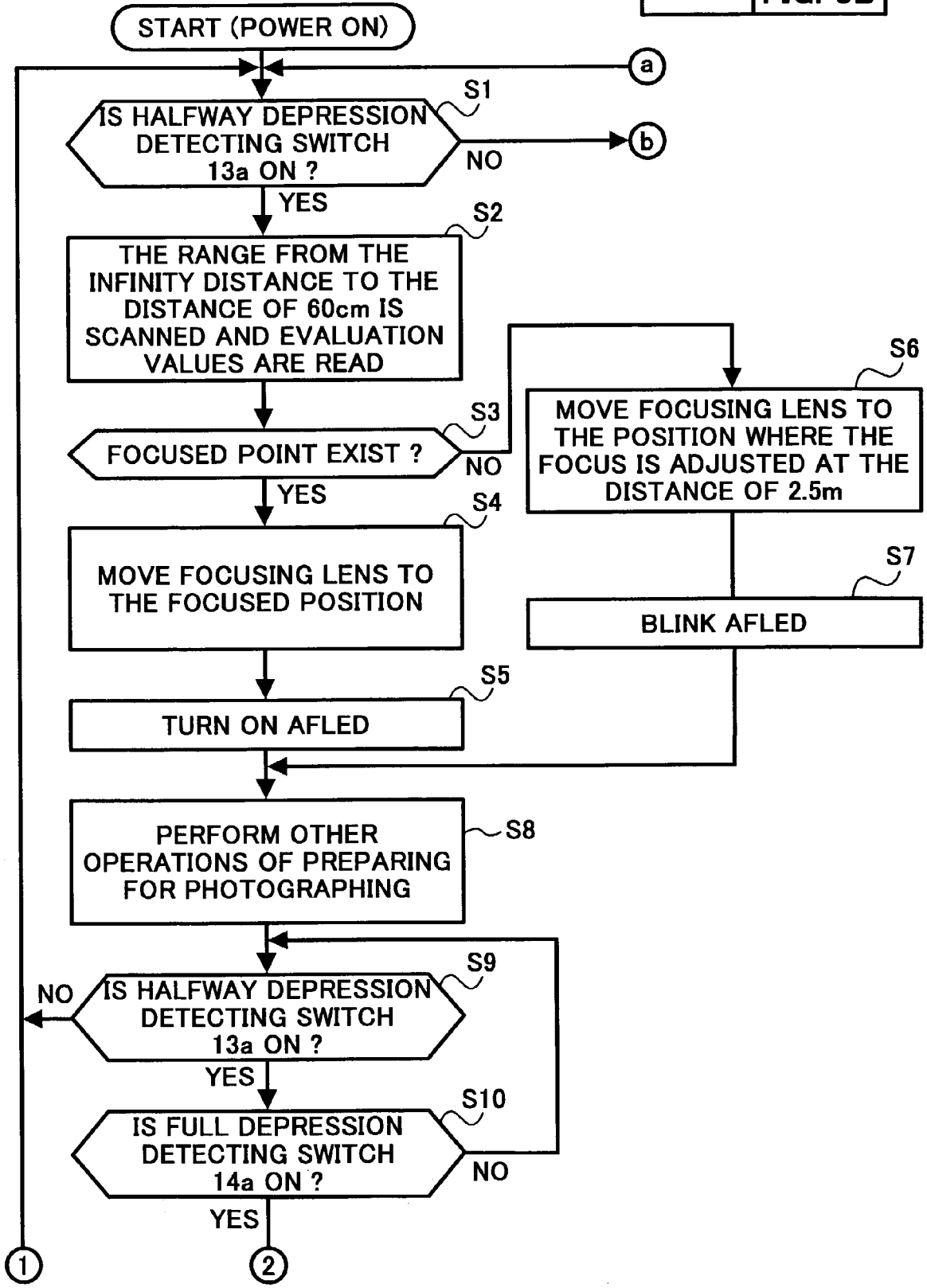
FIG. 3 is a flowchart of an exemplary operation of a CPU of the digital camera according to the first embodiment.
Figure 3B:
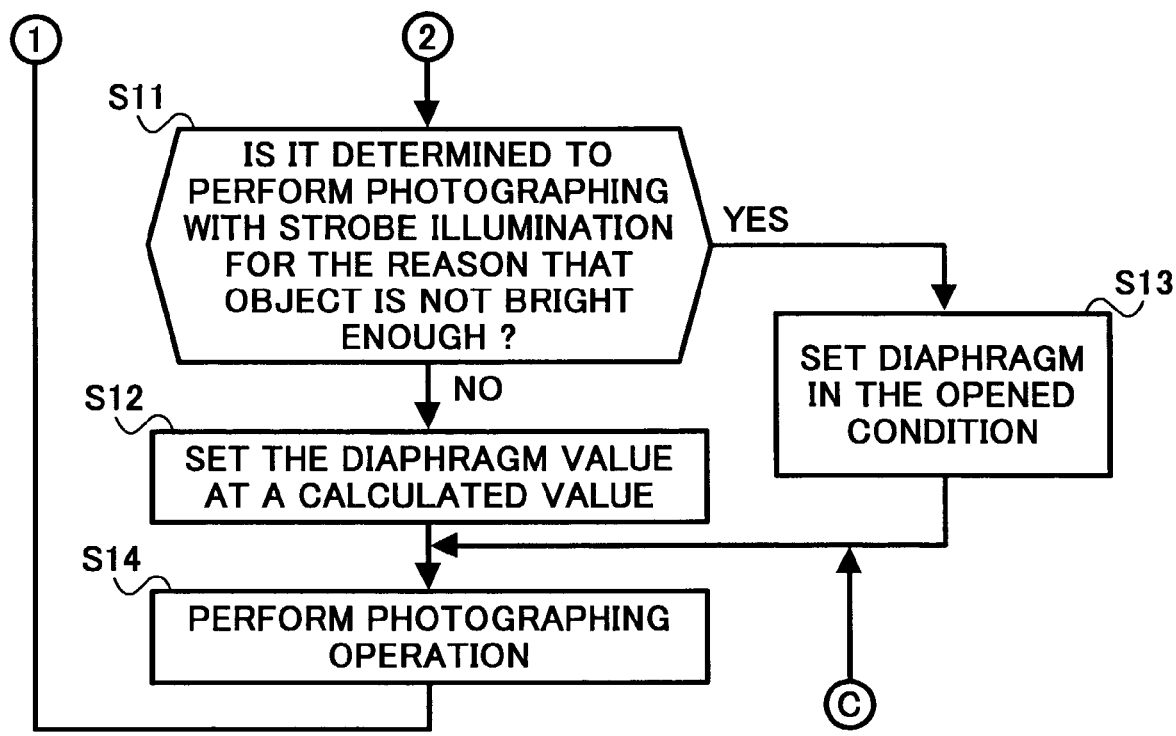
Figure 4A:
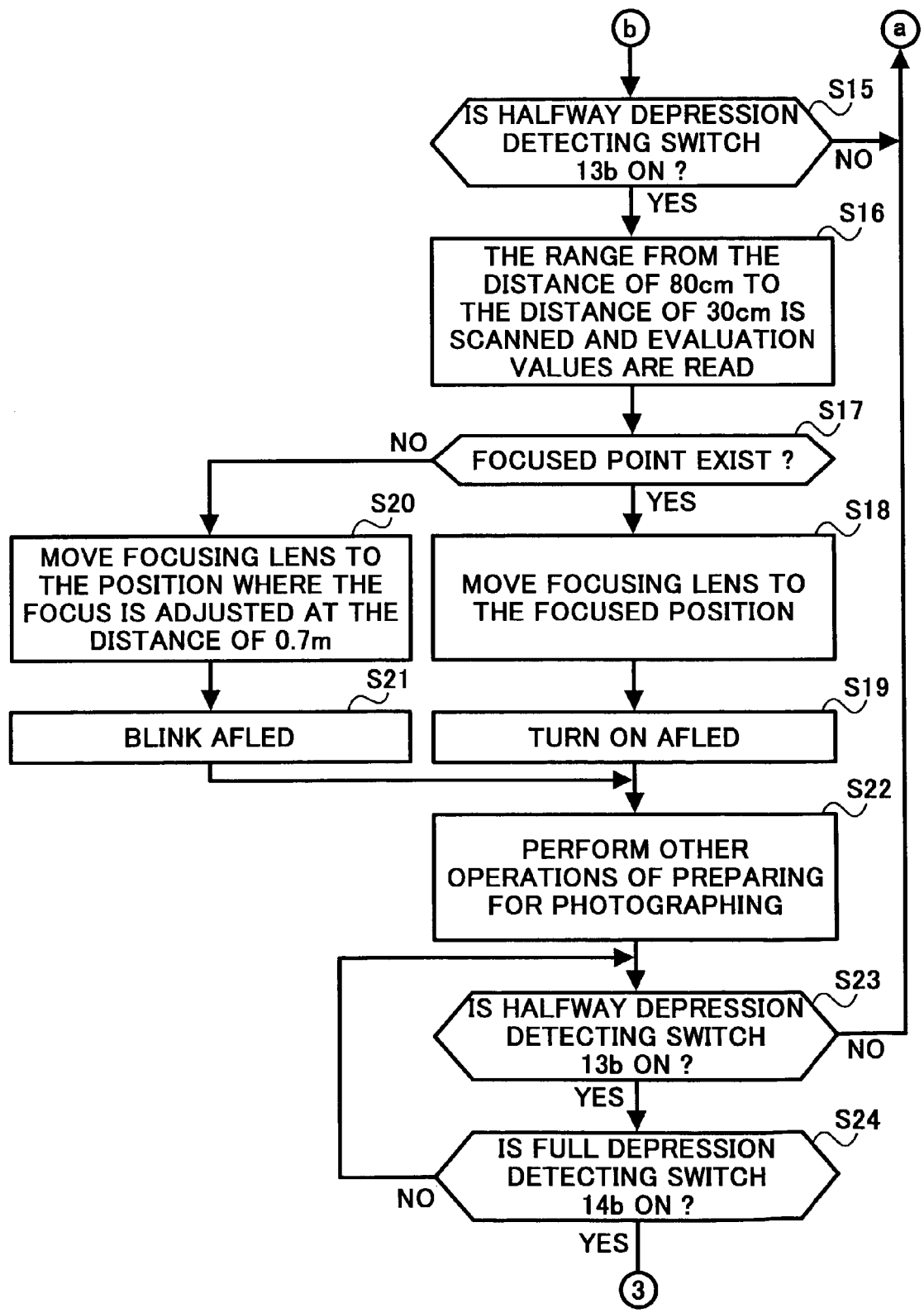
FIG. 4 is another flowchart of the exemplary operation of the CPU of the digital camera according to the first embodiment.
Figure 4B:
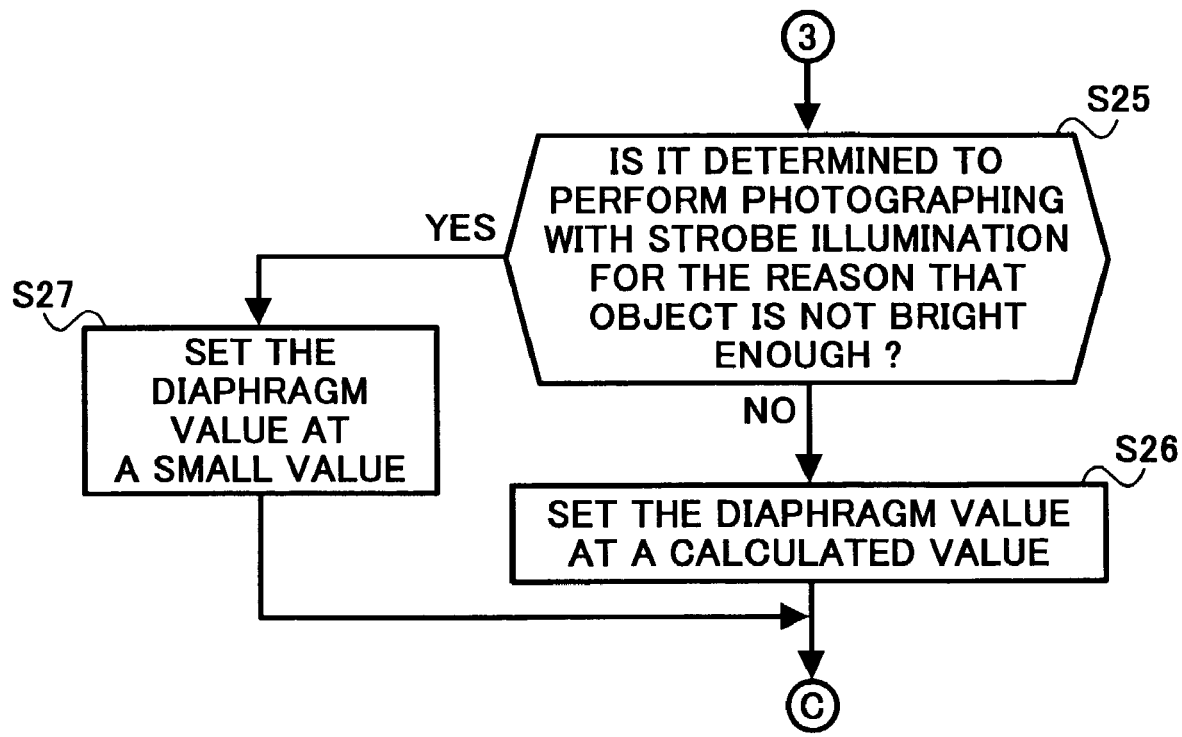

Now, an operation of the digital camera is described referring to FIG. 3 and FIG. 4 illustrating a flowchart of an exemplary operation of the CPU 10a according to the first embodiment.

The CPU 10a starts the operation when a power button (not shown) is turned on, and performs initial setting for various areas formed in the RAM 10c of the system controller 10 in an initial step not illustrated.

In steps S1 and S15, the CPU 10a waits for either of the release buttons A and B to be depressed halfway. When the halfway depression detecting switch 13a is turned on (yes in step S1) and thereby a halfway depressing operation of the release button A is detected, the CPU 10a determines the normal photographing mode for photographing a photographing object at a long distance has been selected, and proceeds to step S2.

In step S2, the CPU 10a controls the focusing lens driving part 3 to move the focusing lens group 1a for focus adjustment in the range of distance from infinity to 60 cm corresponding to the normal photographing mode, and at the same time reads evaluation values of sampled high frequency components of image signals obtained from the photographing element 7. Then, in step S3, the CPU 10a determines if a peak of the evaluation values, which can be considered as a focused point indicating the focused position, exists.

If it is determined that a peak of the evaluation values exists, i.e., a focused point indicating the focused position exists (yes in step S3), the CPU 10a moves the focusing lens group 1a to the focused position, and in step S4, turns on the AFLED of the display part 12 in step S5. If it is determined that a focused point does not exist (no in step S3), in step S6, the CPU 10a moves the focusing lens group 1a to the position where the focus is adjusted at a specified distance (in this example, 2.5 m), and in step S7, the CPU 10a blinks the AFLED of the display part 12 to inform the photographer that auto-focusing has not been successful.

Herein, the specified distance is a distance generally called a fixed focal point, which is determined assuming a probability that photographing objects existing at that distance is relatively high. In the above-described steps S2-S4 and S6, the CPU 10a functions as a focus adjusting device of the present invention.

Thereafter, in step S8, the CPU 10a performs other operations preparing for photographing, and if, in step S9, it is determined that the halfway depression detecting switch 13a is on (yes in step S9), then in step S10, the CPU 10a waits for the release button A to be fully depressed. If it is determined that the halfway depression detecting switch 13a is off in step S9 (no in step S9), the CPU 10a returns to a waiting state in step S1. If it is determined that the full depression detecting switch 14a is on (yes in step S10) and thereby a fully depressing operation of the release button A is detected, in step S11, the CPU 10a determines, based upon a determination result of the strobe controlling part 17, whether to cause the strobe light emitting part 16 to emit a strobe light to perform photographing with strobe illumination.

If it is determined not to cause the strobe light emitting part 16 to emit a strobe light (no in step S11), then in step S12, the diaphragm driving part 5 drives the diaphragm 2 to set a diaphragm value at a calculated value. If it is determined to cause the strobe light emitting part 16 to emit a strobe light (yes in step S11), in step S13, the diaphragm driving part 5 drives the diaphragm 2 to be set in an opened condition. In the above-described steps S11-13, the CPU 10*a* functions as a brightness adjusting device of the present invention.

Then, the CPU 10*a* proceeds to a photographing operation, and in step S14, obtains image data of an image of a photographing object imaged on the imaging surface of the photographing element 7 by controlling a photographing element driving part (not illustrated) driving the photographing element 7. After completing the photographing operation, the CPU 10*a* returns to the waiting state of step S1.

Here, photographing with strobe illumination with the diaphragm 5 set in an opened condition refers to a case that the photographing object is not bright enough. When forcibly performing photographing with strobe illumination even though the photographing object is bright enough, the diaphragm value of the diaphragm 5 is set at an appropriate value.

If it is determined that the halfway depression detecting switch 13*b* is on (yes in step S15) and thereby a halfway depressing operation of the release button B is detected, the CPU 10*a* determines that the macro photographing mode for photographing a photographing object at a short distance has been selected, and proceeds to step S16. In step S16, the CPU 10*a* controls the focusing lens driving part 3 to move the focusing lens group 1*a* for focus adjustment in the range of distance from 80 cm to 30 cm corresponding to the macro photographing mode, and at the same time reads evaluation values of sampled high frequency components of image signals obtained from the photographing element 7.

Thereafter, in steps S17-S24, substantially the same operations as those in steps S3-S10 are performed. In the above-described steps S16-S18 and S20, the CPU 10*a* functions as a focus adjusting device of the present invention.

However, in step S15, if a halfway depressing operation of the release button B is detected, because this indicates that the photographer recognizes that the photographing object is at a short distance, in step S20, the focusing lens group 1*a* is moved to the position where the focus is adjusted at the distance of 0.7 m, closer to the camera than when a halfway depressing operation of the release button A has been detected.

Also, in step S25, if the CPU 10*a* determines not to cause the strobe light emitting part 16 to emit a strobe light (no in step S25), then in step S26, the CPU 10*a* sets the diaphragm value of the diaphragm 2 at an appropriate value, and if the CPU 10*a* determines to cause the strobe light emitting part 16 to emit a strobe light (yes in step S25), then in step S27, the CPU 10*a* sets the diaphragm value of the diaphragm 2 at a small value. The reason of setting the diaphragm value at a small value will be explained later. After setting the diaphragm value of the diaphragm 2, the CPU 10 proceeds to step S14 and performs a photographing operation. In the above-described steps S25-S27, the CPU 10*a* functions as a brightness adjusting device of the present invention.

According to the above-described embodiment, when the release button A is depressed halfway, focus adjustment and diaphragm adjustment in the normal photographing mode are performed, and when the release button B is depressed halfway, focus adjustment and diaphragm adjustment in the macro photographing mode are performed. Thus, with provision of the two release buttons A and B corresponding to the normal and macro photographing modes, respectively, by selecting either of the release buttons A and B and performing a halfway depressing operation thereof, the photographer can easily perform focus adjustment and diaphragm adjustment in the selected photographing mode. That is, because the halfway depressing operation of each of the release buttons A and B for focus adjustment and diaphragm adjustment is combined with the operation of selecting one of the photographing modes, the photographer does not have to perform the operation of selecting one of the photographing modes, and thereby an optimal image of a photographing object reflecting the intention of the photographer can be imaged on a photographing surface of the photographing element 7, quickly.

According to the above-described embodiment, as illustrated in FIG. 2, a plurality of release buttons A and B are arranged in succession on the upper surface F1 of the camera. Accordingly, while maintaining a state of holding the camera, it is possible to select by a finger either of the release buttons A and B to be operated. In addition, the plurality of release buttons A and B are arranged in that order from the side of the side surface of the case of the camera where the opening of the optical system 1 is provided toward the opposing side surface F2 of the case opposing the side surface of the case where the opening of the optical system 1 is provided. Thereby, by depressing the release button A located at the side of the opening of the optical system 1 (i.e., the photographing object side), the normal photographing mode for photographing an object at a long distance is selected, and by depressing the release button B located at the opposing surface F2 (i.e., the photographer side), the macro photographing mode for photographing an object at a short distance is automatically selected. Thus, it is easy for the photographer to memorize to depress a closer release button when photographing a closer photographing object and a distant release button when photographing a distant photographing object, and thereby the photographer is avoided from being at a loss as to which one of two release buttons to be depressed in photographing.

Further, according to the above-described embodiment, the range of distance in which focus adjustment can be performed differs between photographing modes. Thereby, the scanning width for auto-focusing can be made small and the auto-focusing speed fast.

Furthermore, according to the above-described embodiment, the procedure to be performed when auto-focusing is not successful differs between the normal and macro photographing modes, so that the intention of the photographer can be more reliably reflected. Specifically, the photographing distance, that is set when auto-focusing is not successful is different between when a release button for the macro photographing mode is operated and when a release button for the normal photographing mode is operated. The photographing distance set by the release button for the macro photographing mode is shorter than that set by the release button for the normal photographing mode. Therefore, even in the worst case, focus adjustment can be made such that the focus is set at a position closer to the one intended by the photographer, and the probability that a photographed image is blurry can be decreased.

Furthermore, according to the above-described embodiment, in photographing with strobe illumination when the photographer recognizes that a photographing object is at a short distance, the diaphragm value is set small. Thereby, an excessive quantity of a strobe light is avoided and the photographing object is not over-exposed by the strobe light. In digital cameras, generally, automatic strobe controlling is performed. However, in the automatic strobe controlling, a strobe light reflected from a photographing object is detected by a sensor, and emission of the strobe light is stopped when the reflected strobe light reaches an optimum exposure amount. Therefore, when a photographing object is too close, emission of a strobe light must be immediately stopped, which is rather difficult. When a photographing object is relatively close, by setting the diaphragm value at a small value, the emission time can be longer, so that control of the emission of a strobe light is facilitated. In the above-described embodiment, therefore, when the release button B corresponding to the macro photographing mode is operated, in photographing with strobe illumination, the diaphragm value is set small so that the control of a strobe light is facilitated.

In a diaphragm adjusting method, the diaphragm value is changed according to the focused position. However, in such a method, when the focal length of a lens is relatively short (e.g., when the lens is a wide-angle lens), accuracy in the distance of a photographing object which is obtained by the CCDAF method is relatively low. Therefore, it is preferable that the diaphragm value is changed according to the selected photographing mode.

In the above-described embodiment, the photographing range is set to be from the distance of 30 cm to infinity distance, and when the normal photographing mode is selected, the photographing range is set to be from the distance of 60 cm to infinity distance, and when the macro photographing mode is selected, the photographing range is set to be from the distance of 30 cm to the distance of 80 cm. However, this is just an example, and the photographing range when the normal photographing mode is selected can be set, for example, from the distance of 30 cm to 1 m, and when the macro photographing mode is selected, from the distance of 80 cm to infinity distance, so that the scanning width for focus adjustment in photographing a distant photographing object which occurs frequently is made relatively small and thereby the auto-focusing speed can be made fast.

Regarding whether to provide an overlapped portion between the scanning range for focus adjustment in the normal photographing mode and that in the macro photographing mode, for increasing the auto-focusing speed as much as possible, it is preferable that such an overlapped portion is not provided. However, if the photographing ranges of the normal photographing mode and the macro photographing mode are set to be from the distance of 30 cm to 60 cm and from the distance of 60 cm to infinity distance, respectively, when a photographing object is located at the distance of about 60 cm, it is difficult for the photographer to determine which one of the release buttons A and B to be depressed. Therefore, from the viewpoint of operability of the camera, it is preferable to provide an overlapped range where the focus can be adjusted by either of the release buttons A and B.

Further, in moving the focusing lens group 1a through each scanning range for focus adjustment and determining if a peak of evaluation values of image signals exists, a method of stopping the focusing lens group 1a once an apparent peak has been found without moving the focusing lens group 1a through the whole portion of the scanning range may be used. In this instance, because of a synergy effect between the advantage obtained in moving the focusing lens group 1a through only a specified portion of the scanning range as in the above-described embodiment and that obtained in stopping the focusing lens group 1a when an apparent peak of evaluation values has been obtained, the auto-focusing time is made faster.

Also, the distances the focus is adjusted at when auto-focusing is not successful in the above-described embodiment are just examples, and depending upon the characteristics of cameras, the distances the focus is adjusted at when auto-focusing is not successful can be various.

Figure 5:
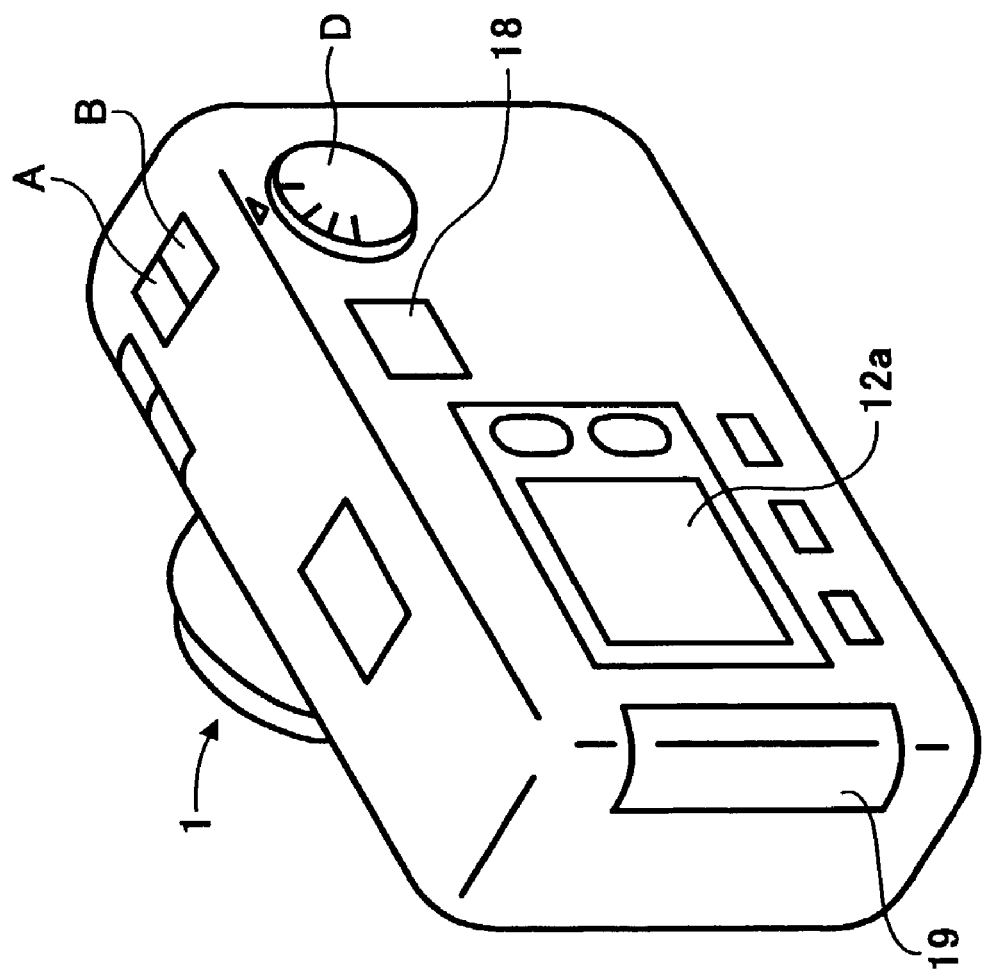
FIG. 5 is a schematic drawing of another outer appearance of the digital camera.

Furthermore, the release buttons A and B can be arranged in a similar manner as in the above-described embodiment in a vertical type camera illustrated in FIG. 5. In this case, however, because the width of an upper surface of the camera is narrow, for providing the release buttons A and B to the upper surface of the camera so as to be arranged in that order from the photographing object side to the photographer side, the release buttons A and B must be made relative small.

Now, the second embodiment of the present invention is described. The construction of a digital camera of the second embodiment is substantially the same as that of the first embodiment, and therefore the description thereof is omitted.

Figure 6A:
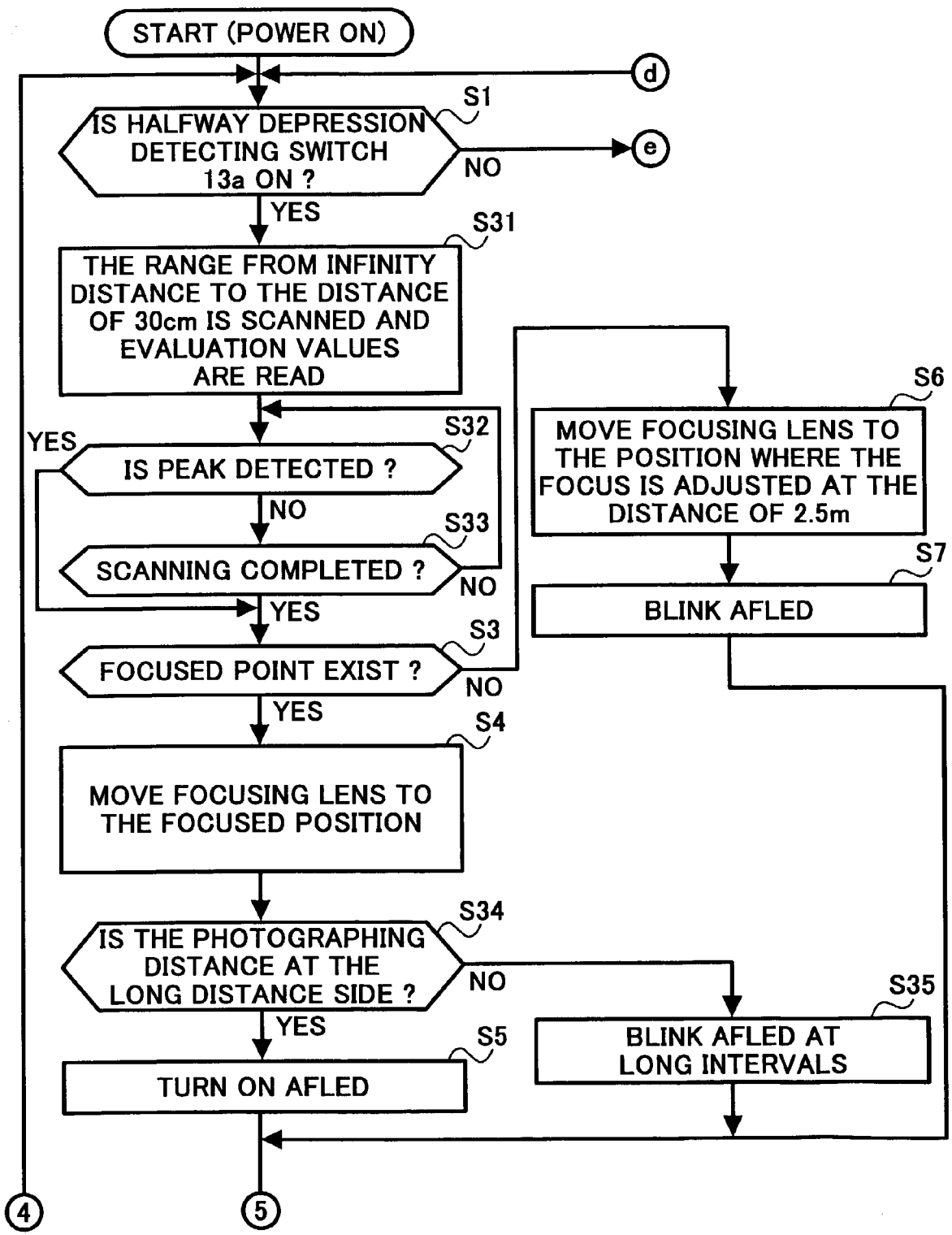
FIG. 6 is a flowchart of an exemplary operation of the CPU of the digital camera according to the second embodiment of the present invention.
Figure 6B:
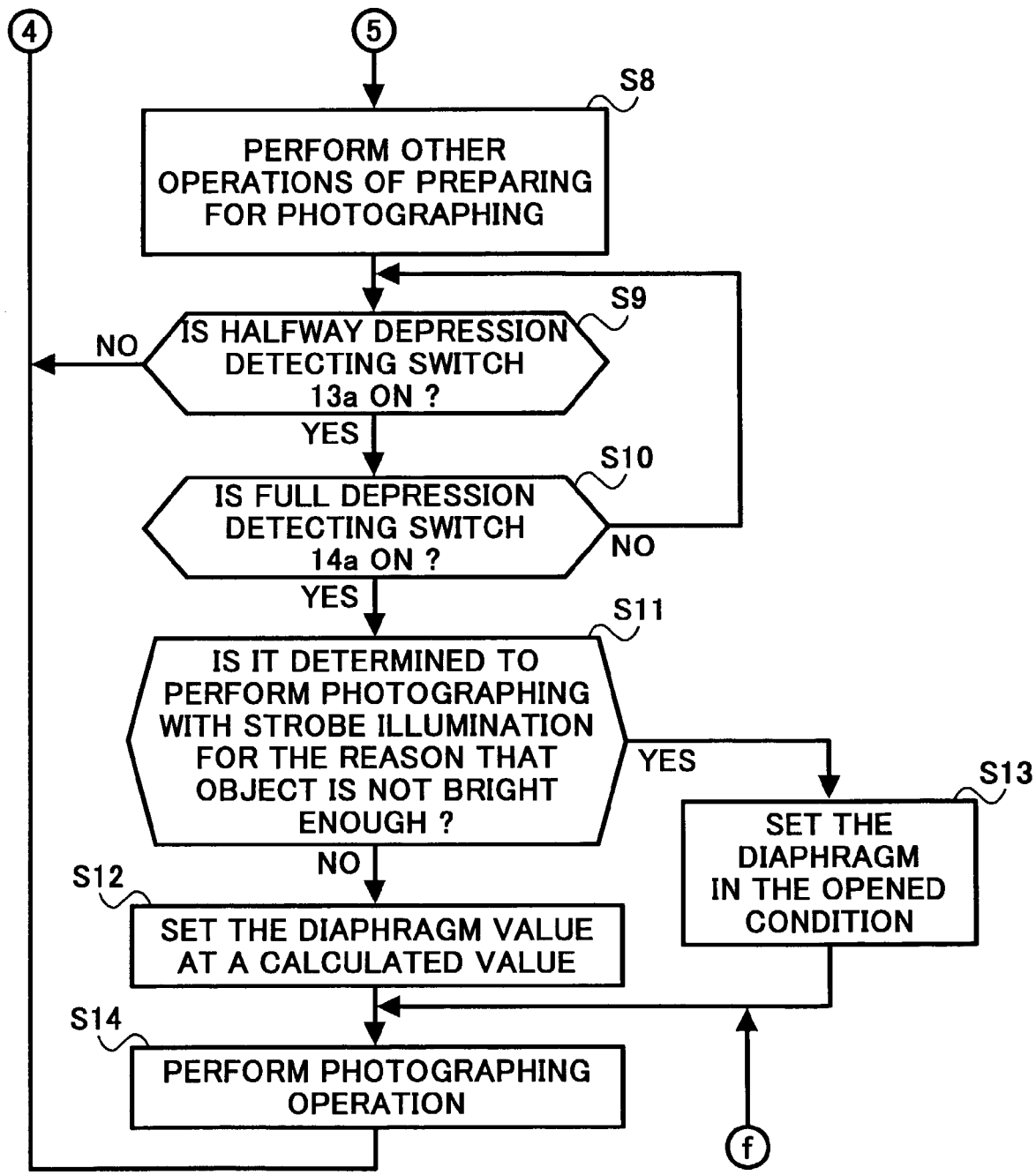
Figure 7A:
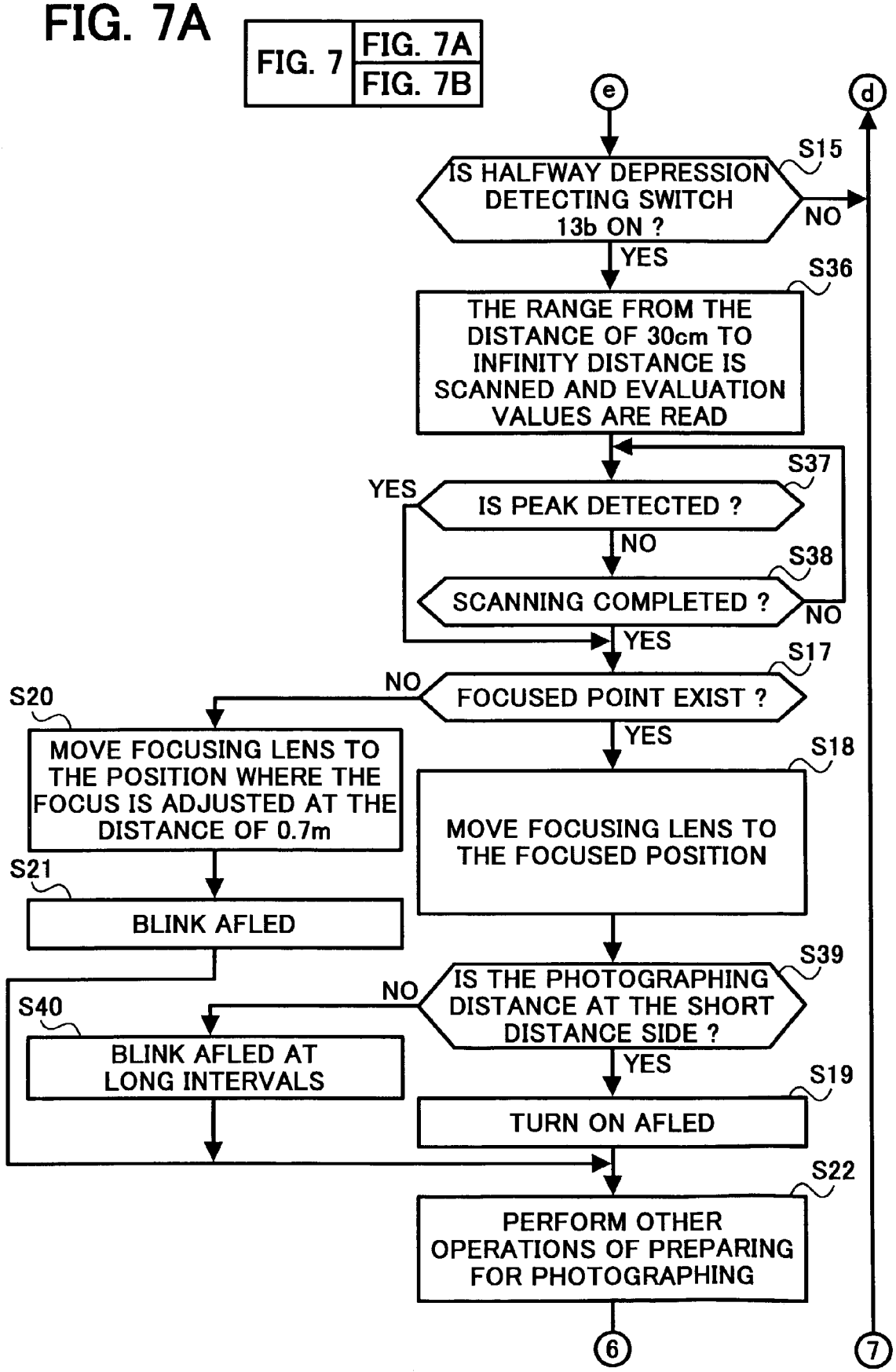
FIG. 7 is another flowchart of the exemplary operation of the CPU of the digital camera according to the second embodiment.
Figure 7B:
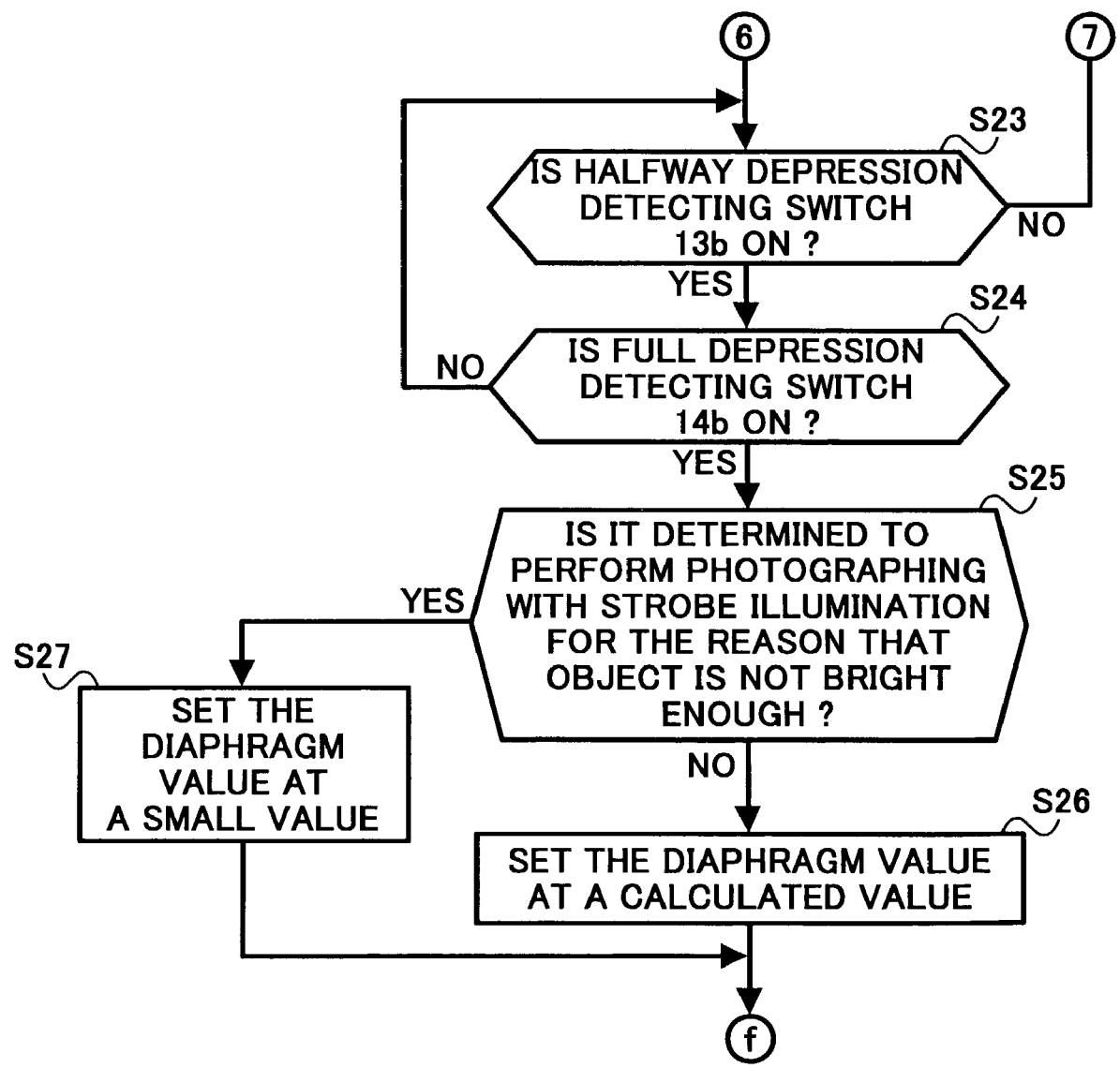

An operation of the camera is described referring to FIGS. 6 and 7 illustrating a flowchart of an exemplary operation of the CPU 10a of the camera according to the second embodiment. The steps performing substantially the same operations as those in the first embodiment are denoted by like references, and the following description is made focusing on the parts after step S3 1, that are different from the first embodiment.

When the halfway depression detecting switch 13a is turned on (yes in step S1) and thereby a halfway depressing operation of the release button A is detected, in step S31, the CPU 10a controls the focusing lens driving part 3 to move the focusing lens group 1a through the whole portion of the range of distance in which the focus can be adjusted. In step S31, for increasing the speed of adjusting the focus on a photographing object at a long distance, the CPU 10a controls the focusing lens driving part 3 to move the focusing lens group 1a through the range of distance in which the focus can be adjusted from the long distance (infinity distance) side toward the short distance (30 cm) side. At this time, in step S4, if a peak of evaluation values of high frequency components of image signals that can be considered as a focused point indicating the focused position is detected (yes in step S32 and yes in step S3), the CPU 10a moves the focusing lens group 1a to the focused position, and if movement of the focusing lens group 1a through the range of distance in which the focus can be adjusted is completed without detecting a peak of evaluation values (yes in step S33 and yes in step S3), the CPU 10a moves the focusing lens group 1a to a position that is most highly presumed to be the focused position in step S4.

Here, in detecting a peak of evaluation values of high frequency components of image signals, when an extreme value is found, it is not necessary immediately determined that the peak has been detected. When an extreme value is found, for determining if the position where the extreme value has been found is a real focused position, it is necessary to determine if a contrast of a photographing object is equal to or greater than a predetermined value, or if the height of a peak is equal to or greater than a predetermined value. Further, two kinds of evaluation values, those of high frequency components and those of relatively low frequency components may be used for such determination. If the above determination is made in a loose manner, false focusing, in which the focus is adjusted to the position where a wrong extreme value has been found, frequently occurs, resulting in deteriorating the quality of the camera.

Accordingly, if it is not certain that an extreme value represents a peak of evaluation values, after the focusing lens group 1a has been moved through the whole scanning range, positions where extreme values have been found are compared with each other to determine the focused position. When an apparent peak that can be considered as a focused point is not detected even after moving the focusing lens group 1a through the whole scanning range (no in step S3), as in the first embodiment, in steps S6 and S7, the CPU 10a moves the focusing lens group 1a to the position where the focus is adjusted at a specified distance, and blinks the AFLED of the display part 12 to inform the photographer that auto-focusing has not been successful. In the above-described steps S31-S33, S4 and S6, the CPU 10a functions as a focus adjusting device of the present invention.

Then, after moving the focusing lens group 1a to the focused position in step S4, in step S34, it is determined if the photographing distance corresponding to the focused position is at the long distance side. The fact that the release button A has been operated indicates that the photographer intends to photograph a photographing object at a long distance. Therefore, if the photographing distance corresponding to the focused position is at the short distance side (no in step S34), it is conceivable that for some reason the focus has been erroneously adjusted to the short distance side.

Accordingly, when it is determined that the photographing distance corresponding to the focused position is at the short distance side (no in step S34), in step S35, the photographer is informed that the focused position differs from that intended by the photographer by blinking the AFLED at long intervals. Here, long-interval blinking of the AFLED refers to an operation of repeating turning on and off of the AFLED every 1-2 seconds, so as to be differentiated from a turned-on state of the AFLED in step S5 or a blinking state (repeatedly turning on and off in a relatively short time) in step S7. Here, even when the focused position differs from the one intended by the photographer, it does not necessarily mean that the focused position is incorrect. Therefore, the purpose of the operation of step S35, i.e., blinking the AFLED at long intervals, is to merely caution the photographer, and subsequent operations after S35 are substantially the same as those in the first embodiment.

If the halfway depression detecting switch 13b is turned on (yes in step S15) and a halfway depressing operation of the release button B is detected, the CPU 10a controls the focusing lens driving part 3 to move the focusing lens group 1a through the whole portion of the range of distance in which the focus can be adjusted. In step S36, for increasing the speed of adjusting the focus on a photographing object at a short distance, contrary to the operation of step S31, the CPU 10a controls the focusing lens driving part 3 to move the focusing lens group 1a through the range of distance in which the focus can be adjusted from the short distance (30 cm) side toward the long distance (infinity distance) side.

At this time, if a peak of evaluation values of high frequency components of image signals that can be considered as a focused point indicating the focused position is detected (yes in step S37 and yes in step S17), in step S18, the CPU 10a moves the focusing lens group 1a to the focused position, and if movement of the focusing lens group 1a through the range of distance in which the focus can be adjusted is completed without detecting a peak of evaluation values (yes in step S38 and yes in step S17), the CPU 10a moves the focusing lens group 1a to a position that is most highly presumed to be the focused position. In the above-described steps S36-S38, S17, S18, and S20, the CPU 10a functions as a focus adjusting device of the present invention.

The operations in subsequent steps S39 and S40 are substantially the same as those in steps S34 and S35. At this time, because the photographer intends to photograph a photographing object at a short distance, if the photographing distance corresponding to the focused position is at the long distance side, the AFLED is blinked at long intervals.

Generally, in a mechanical driving part of a camera such as a focusing lens driving system requiring strict accuracy in moving a focusing lens, for removing a backlash effect, a control method is used to make the moving direction of the focusing lens in a last operation always be the same. In this embodiment, the moving direction of the focusing lens group 1a is different between the operations in step S31 and S36. Therefore, in this embodiment, information of a difference between peaks detected when the focusing lens group 1a is moved from the long distance side toward the short distance side and when the focusing lens group 1a is moved from the short distance side toward the long distance side is stored in advance so that the difference is corrected.

As described above, in the second embodiment, the direction in which the focusing lens group 1a is moved in auto-focusing is different for each photographing mode selected by a release button, so that increasing of the auto-focusing speed is realized.

Further, if the focused position differs from one intended by the photographer, the photographer is informed to that effect by indication, and thereby the photographer can determine that the focus has been erroneously adjusted. Therefore, the photographer can avoid a blurred photograph from being obtained by his or her judgment. Furthermore, the blinking of the AFLED usually indicates to the photographer whether or not an auto-focusing operation has been successfully completed. Therefore, the photographer can easily recognize that the focused has been erroneously adjusted.

Now, the third embodiment of the present invention is described.

In the second embodiment, as indicated in step S31, when the normal photographing mode is selected, the focusing lens group 1a is moved through the range of distance in which the focus can be adjusted from the long distance (infinity distance) side toward the closest distance (30 cm) side. In the third embodiment, in step S31, for increasing the speed of adjusting the focus on a photographing object at a long distance, movement of the focusing lens group 1a through the range of distance in which the focus can be adjusted is started from the position of photographing an object at a middle distance (e.g., 1 m), not from the position of photographing an object at the closest distance. If a peak of evaluation values of high frequency components of image signals that can be considered as a focused point indicating the focused position is detected (yes in step S32 and yes in step S3), the focus is adjusted to the focused position, and if movement of the focusing lens group 1a through the range of distance in which the focus can be adjusted is completed without detecting a peak of evaluation values, the focusing lens group 1a is returned to the position of photographing an object at the closest distance to move from that position to the position of photographing an object at the middle distance (1 m).

Thus, in the third embodiment, by changing the position where the focusing lens group 1a starts to move for focus adjustment between when the release buttons A and B are operated, high speed auto-focusing on objects at a long distance and a short distance are both realized while making the direction in which the focusing lens group 1a is moved for focus adjustment the same. Therefore, correction of a difference between peaks of evaluation values of high frequency components of image signals when the focusing lens group 1a is moved from the long distance side toward the short distance side and from the short distance side toward the long distance side, that is necessary in the second embodiment, is not necessary. In the third embodiment, as described above, because the position where the focusing lens group 1a starts to be moved for focus adjustment differs between photographing modes, the speed of auto-focusing a photographing object at a distance recognized by the photographer can be increased.

Now, the fourth embodiment of the present invention is described.

In the above-described first to third embodiments, basically, increasing the auto-focusing speed is accomplished using the feature that the distance of a photographing object recognized by the photographer is known based upon which one of the release buttons A and B has been selected by the photographer. Accuracy of auto-focusing can also be increased using this feature. In the fourth embodiment, if a plurality of candidate focused points are found as a result of moving the focusing lens group 1a for focus adjustment, in determining one of the plurality of candidate focused points as the focused point, whether to give priority to a candidate focused point of the plurality of candidate focused points at the long distance side or the short distance side is determined by the operated release button.

Figure 8A:
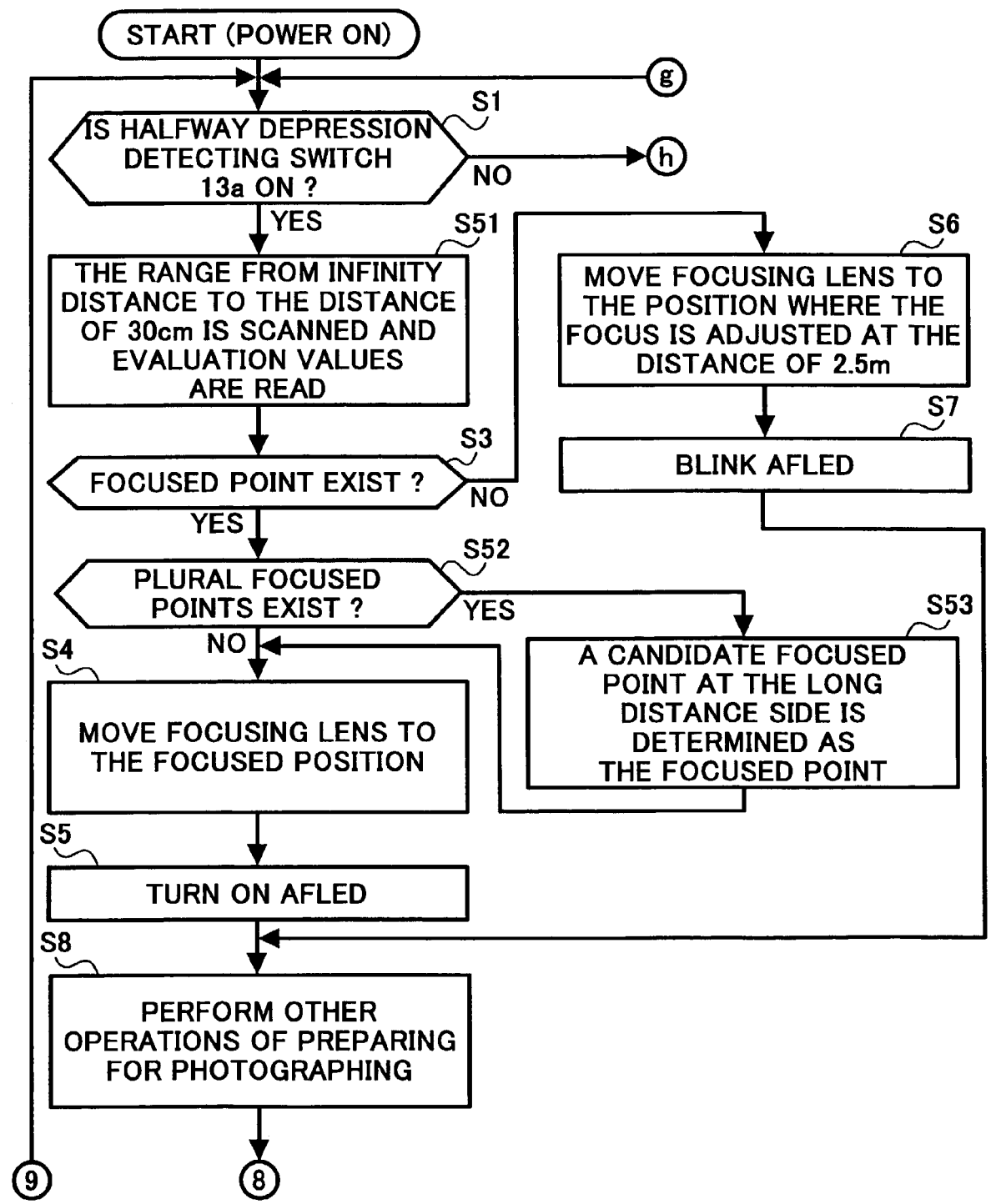
FIG. 8 is a flowchart of an exemplary operation of the CPU of the digital camera according to the fourth embodiment of the present invention.
Figure 8B:
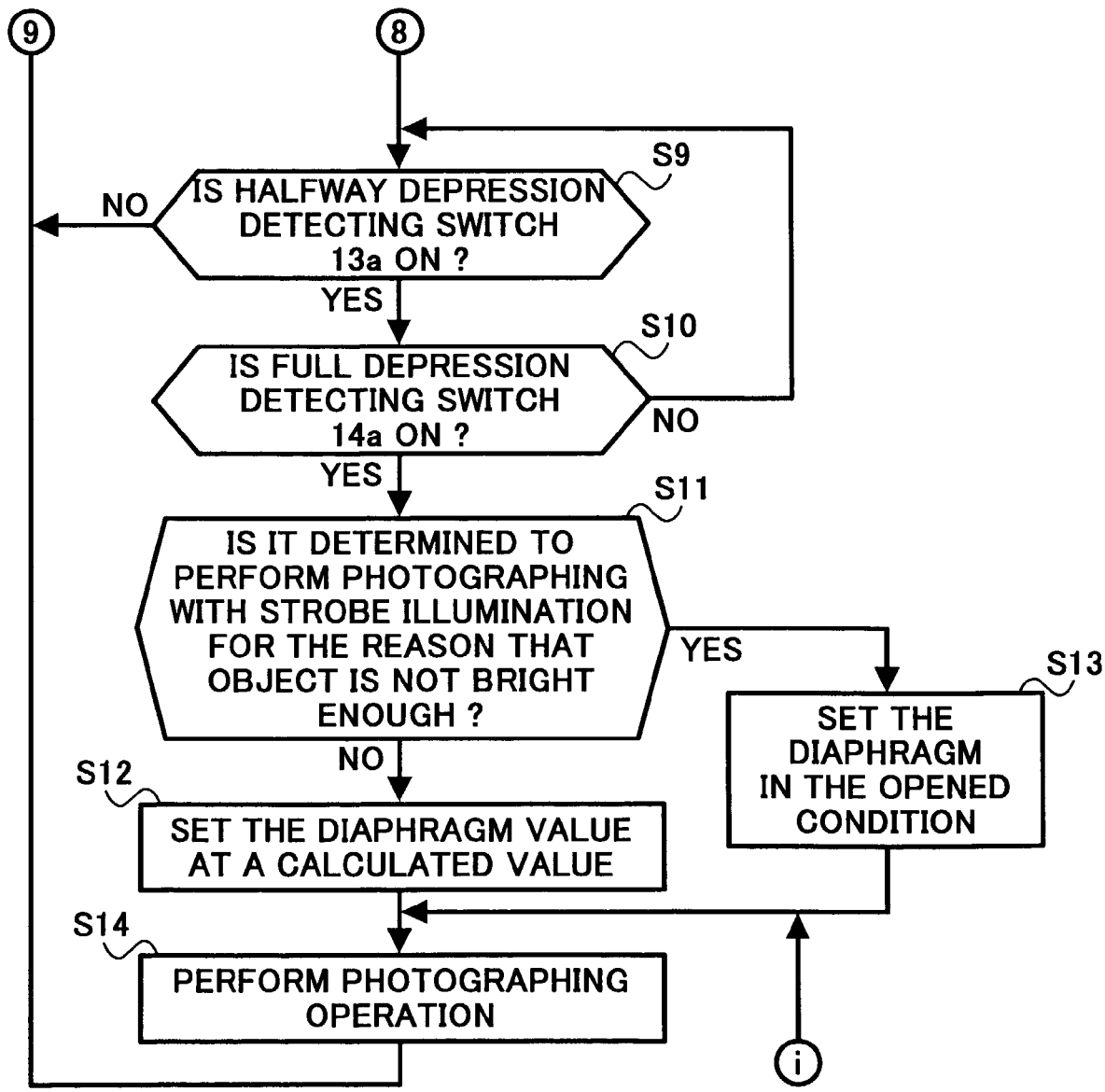
Figure 9B:
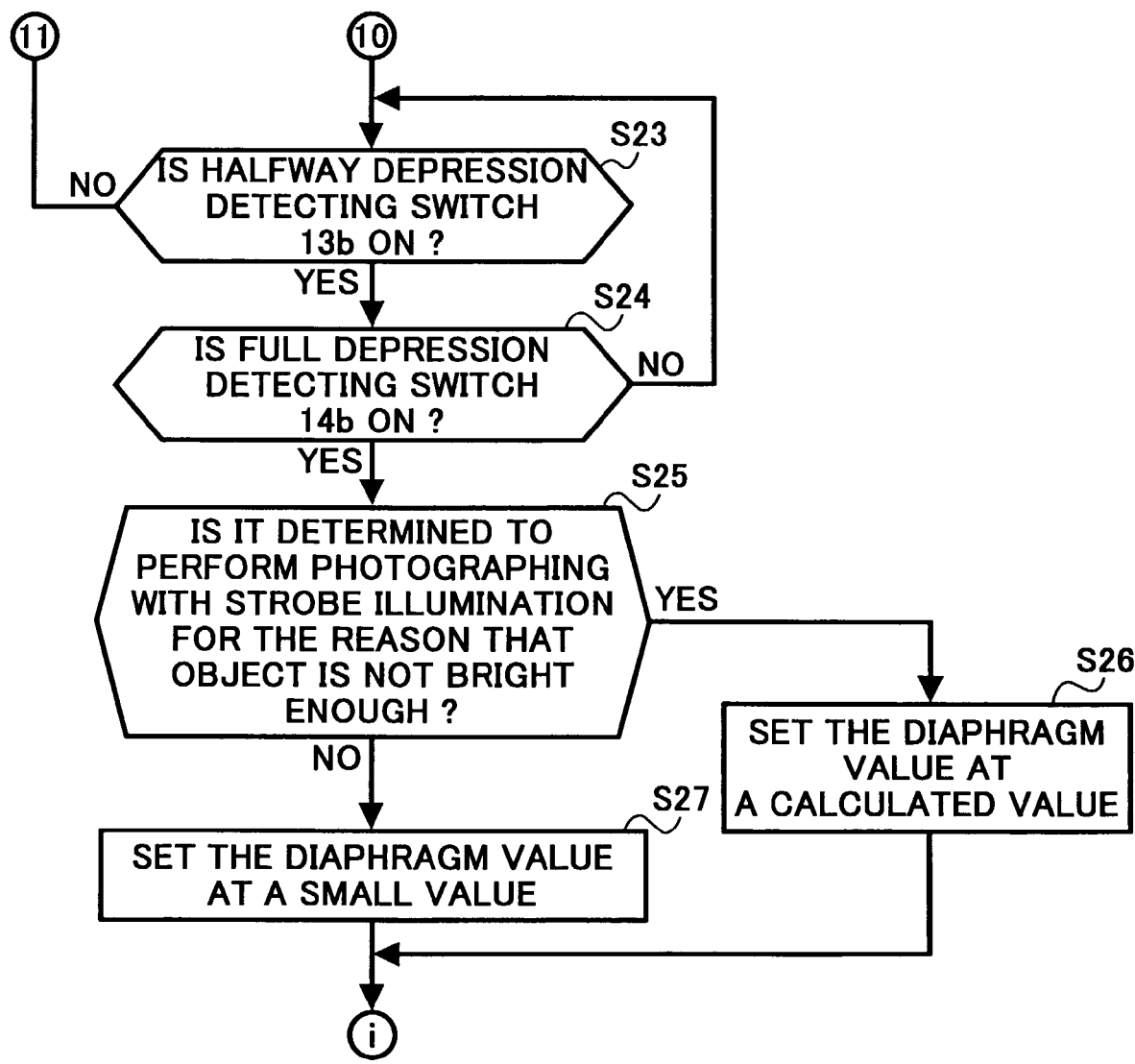
FIG. 9 is another flowchart of the exemplary operation of the CPU of the digital camera according to the fourth embodiment.
Figure 10:
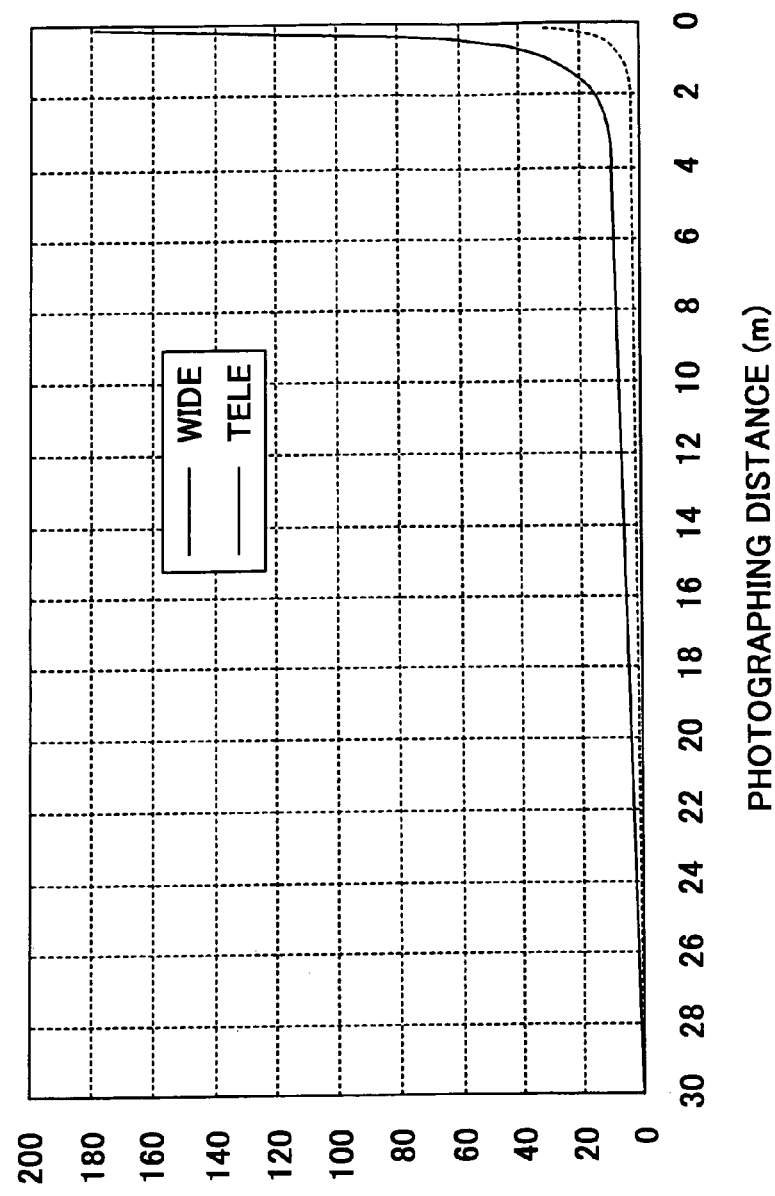
FIG. 10 is a diagram illustrating a relation between the photographing distance and the focusing lens driving amount.
Figure 11:
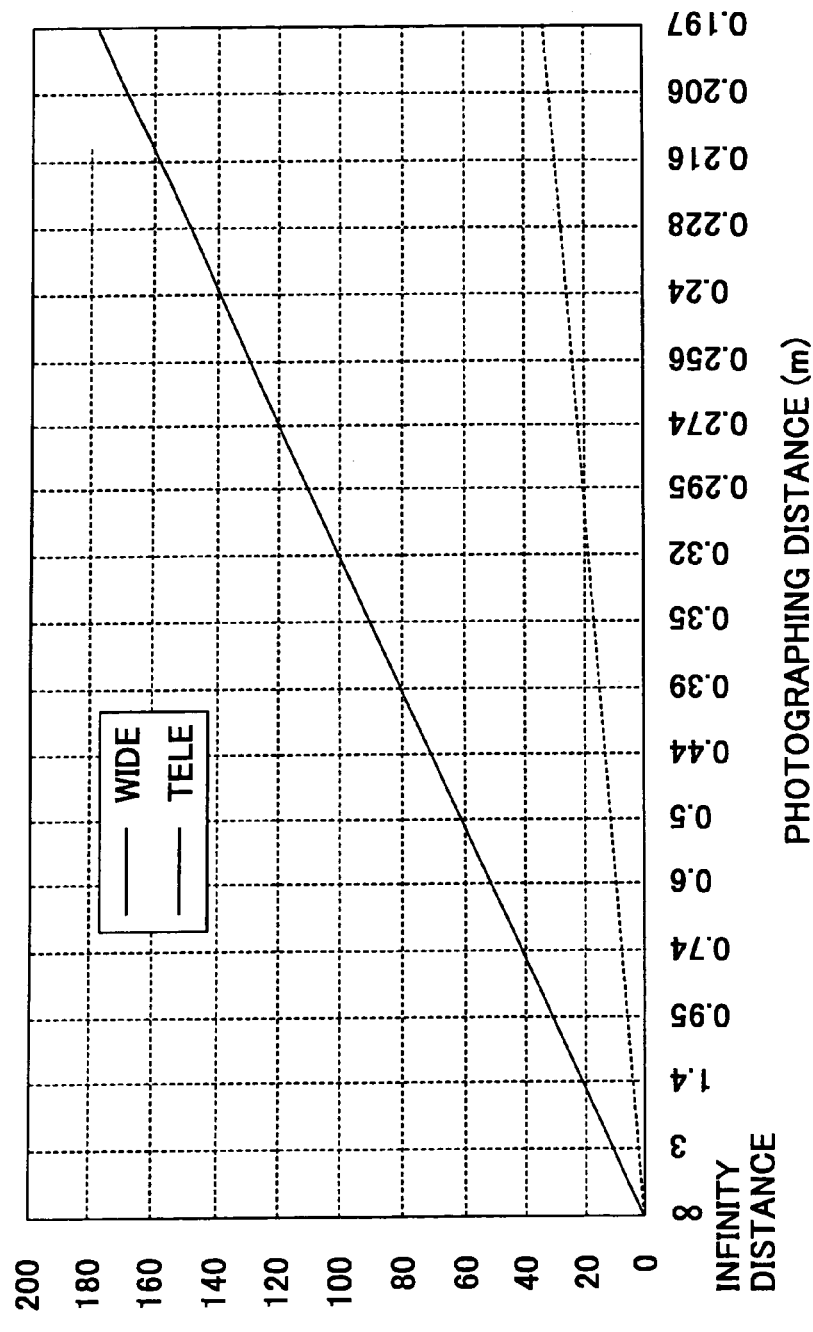
FIG. 11 is another diagram illustrating a relation between the photographing distance and the focusing lens driving amount.

FIGS. 8 and 9 illustrate a flowchart of an operation of the CPU 10a of the camera according to the fourth embodiment. The operations that are substantially the same as those in FIGS. 3 and 4 are denoted by like symbols and description thereof is omitted.

When either of the halfway depression detecting switch 13a and the halfway depression detecting switch 13b is turned on, the focusing lens group 1a is moved through the whole portion of the range of distance in which the focus can be adjusted (30 cm to infinity distance) in step S51 or S54. Thereafter, it is determined if a focused point exists in step S3 or step S17, and if a focused point exists (yes in S3 or yes in step S17), it is determined in step S52 or step S55 if a plurality of candidate focused points exist.

If a plurality of candidate focused points exist (yes in S52 or yes in step S55), in step S53, because the halfway depression detecting switch 13a has been turned on in step S1, the priority is given to a candidate focused point at the long distance side, which is determined as the focused point, and in step S56, because the halfway depression detecting switch 13b has been turned on in step S15, the priority is given to a candidate focused point at the short distance side, which is determined as the focused point. Here, a candidate focused point in the plurality of candidate focused points, that is most distant (or closest), may be selected as the focused point. However, the method to multiply evaluation values at respective candidate focused points with coefficients differently weighted according to distances and to select the candidate focused point where a maximum resulting evaluation value is obtained as the focused point is preferable to select a more practical focused position. In the above-described steps S51-S56, S3, S4, S6, S17, S18 and S20, the CPU 10a functions as a focus adjusting device of the present invention.

As described above, in the fourth embodiment, when a plurality of candidate focused points exist as a result of moving the focusing lens group 1a for focus adjustment, in determining one of the plurality of candidate focused points as the focused point, whether to give priority to a candidate focused point at the long distance side or the short distance side is determined by the photographing mode corresponding to the operated release button. Accordingly, the intention of the photographer as to the photographing distance can be reflected on selection of the focused position, so that the photographer can photograph a photographing object as intended. Further, by using a method of weighting evaluation values according to photographing distances, even when either of the release buttons A and B is erroneously depressed, deviation of the focused position from one intended by the photographer can be suppressed.

In the above-described first to fourth embodiments, the intention of the photographer with respect to the distance of a photographing object is determined at the side of the camera based upon the manipulation of either of a plurality of (or either of two) release buttons, to be reflected in the operation of the camera.

It is conceivable to determine intentions of the photographer other than the one with respect to the distance of a photographing object based upon the operation of release buttons.

For example, a fast auto-focusing mode and a high-accuracy auto-focusing mode may be assigned to a plurality of release buttons. As described earlier, in the CCDAF method, generally a focusing lens is moved through the whole portion of the range of distance for focus adjustment, however, by making the portion of the range of distance through which the focusing lens is moved small (i.e., the scanning width small), the speed of auto-focusing can be faster. In this case, evaluation values at skipped points of the range of distance may be obtained by interpolating calculation, however, when a photographing object has low contrast, accuracy in auto-focusing might be insufficient.

Accordingly, by changing the scanning width for focus adjustment according to a selected release button, switching between a fast auto-focusing mode and a high-accuracy auto-focusing mode can be realized. Thereby, the photographer can use the fast auto-focusing mode at one occasion and the high-accuracy auto-focusing mode at another occasion according to the intention of the photographer or the condition of a photographing object, so that an image in which the intention of the photographer is more accurately reflected can be obtained.

Similarly, a single auto-focusing mode and a continuous auto-focusing mode can be assigned to a plurality of release buttons, respectively. Generally, with a halfway depressing operation of a release button, the focus and the exposure adjustment are fixed, and a framing operation is performed as necessary while the release button is being kept halfway depressed. However, when a photographing object is a moving one, it is easier for the photographer to photograph the moving photographing object if continuous auto-focusing can be performed even in a state that the release button is being halfway depressed. Therefore, by assigning a single auto-focusing mode and a continuous auto-focusing mode to a plurality of release buttons, respectively, the photographer can use the single auto-focusing mode and the continuous auto-focusing mode in an appropriate manner, without changing the photographing mode, according to the intention of the photographer or the condition of a photographing object, so that an image in which the intention of the photographer is more accurately reflected can be obtained.

Here, a technique of continuous auto-focusing is explained. In auto-focusing using an external distance measuring device, such as an auto-focusing module, distance measurement can be continuously performed, and based upon a result of the distance measurement, the focused position can be moved in a fine pitch. However, in the CCDAF method, each auto-focusing operation takes a relatively long time, and in addition, a method used in a video movie camera must be used. Namely, when auto-focusing is performed for the first time or when a lens system is largely out of focus, the auto-focusing operation that is substantially the same as the one described above is performed, and after the focus has been adjusted, the lens system is slightly moved in a vicinity of that position where the focus has been adjusted and evaluation values are read, so that the focused state is maintained.

In all of the above-described embodiments, the description has been made for the case where two release buttons are provided. However, the number of release buttons is not limited to two, and can be three or more. When three release buttons are provided, a long distance photographing mode, a medium distance photographing mode, and a short distance photographing mode can be assigned to the three release buttons, respectively. It is conceivable also to assign a high speed auto-focusing mode, a high accuracy auto-focusing mode, and a continuous auto-focusing mode to the three release buttons, respectively.

Lastly, the operation of the camera after focus adjustment reflecting the intention of the photographer has been performed by one of a plurality of release buttons is described.

In a camera in which a plurality of release buttons are provided, when one of the plurality of release buttons is being halfway depressed, other release buttons of the plurality of release buttons can also be operated. Therefore, it is conceivable that the photographing mode is switched to another photographing mode other than the normal and macro photographing modes described above when another release button besides the release button being halfway depressed is manipulated before the release button being halfway depressed is fully depressed to give an instruction of performing a photographing operation. Thus, by using one of a plurality of release buttons other than the one being halfway depressed for a manipulating device for performing a switching operation to give an instruction of switching the photographing mode to another mode, it is not necessary to provide a button for performing the switching operation separately from the release buttons. Thereby, the manipulation of the camera is facilitated and the cost of the camera is reduced.

As the above-described another mode, various modes can be conceivable. The following description is made assuming that three release buttons are provided.

First, a manual focusing mode can be assigned to one the three release buttons. Digital cameras usually have a manual focusing mode, in addition to an auto-focusing mode. In the manual focusing mode, the focused position can be shifted in a direction intended by the photographer when it is hard to focus the photographing object by the CCDAF method or when the photographer intentionally shifts the focused position.

In this case, because the focused position can be shifted in two directions, in the directions of long distance and short distance, two buttons are necessary. In most of background digital cameras, auto-focusing and manual focusing modes are switched by a mode switching button, and therefore, after the focus has been adjusted by the auto-focusing mode once, adjusting the focus again by the manual focusing mode is extremely troublesome. According to the present invention, because a manual focusing mode can be performed by the two release buttons other than the one being halfway depressed, a mode switching operation is avoided, so that the manual focusing mode can be easily performed.

Further, a variation of the auto-focusing mode, in which information of a plurality of candidate focused positions are stored when auto-focusing is performed and the focused position is shifted to the plurality of candidate focused positions by manipulation of one of a plurality of release buttons other than the one being halfway depressed, can be implemented. Another variation of the auto-focusing mode is also conceivable, in which by manipulating one of a plurality of release buttons other than the one being halfway depressed, auto-focusing is performed again through the portion of the range of distance for focus adjustment at the long distance or short distance side from the current focused position to set a new focused position.

Thus, by using one of a plurality of release buttons other than the one being halfway depressed for a manipulating device for performing a switching operation to give an instruction of switching the photographing mode to another mode, the photographer can shift the focused position toward the direction intended by the photographer without performing an extra switching operation while maintaining a state of holding the camera. Here, when three release buttons are provided, it is easier for the photographer to understand the operation of two release buttons, other than the one being halfway depressed, of the three release buttons, if the two release buttons are configured such that the focused position is shifted toward the long distance side by manipulation of one of the two release buttons that is located at the side of the photographing object and toward the short distance side by manipulation of the other of the two release buttons that is located at the side of the photographer.

For example, when a release button of the three release buttons corresponding to a photographing mode for photographing an object at a long distance is halfway depressed, the focused point is shifted toward the long distance side by manipulating a release button of the three release buttons corresponding to a photographing mode for photographing an object at a middle distance, and toward the short distance side by manipulating a release button of the three release buttons corresponding to a photographing mode for photographing an object at a short distance.

Similarly, when the release button corresponding to the photographing mode for photographing an object at a middle distance is halfway depressed, the focused position is shifted toward the long distance side by manipulating the release button corresponding to the photographing mode for photographing an object at a long distance, and toward the short distance side by manipulating the release button corresponding to the photographing mode for photographing an object at a short distance. When the release button corresponding to the photographing mode for photographing an object at a short distance is halfway depressed, the focused position is shifted toward the long distance side by manipulating the release button corresponding to the photographing mode for photographing an object at a long distance, and toward the short distance side by manipulating the release button corresponding to the photographing mode for photographing an object at a middle distance.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 2001-316328 filed in the Japanese Patent Office on Oct. 15, 2001, and the entire contents of which are hereby incorporated by reference.

The invention claimed is:

1. A photographing object image adjusting apparatus comprising:
a plurality of adjusting operation devices including a first release button manipulable to a first image adjusting position to give a first image adjusting instruction corresponding to a first object image adjusting mode and a second release button manipulable to a second image adjusting position to give a second image adjusting instruction corresponding to a second object image adjusting mode; and
an object image adjusting device configured to adjust an image of an object imaged on an imaging surface of a photographing element to achieve a first adjusted image in accordance with receipt of the first image adjusting instruction or to achieve a second adjusted image in accordance with receipt of the second image adjusting instruction,
wherein said first release button is further manipulable from the first image adjusting position to a first photographing position to give a first photographing instruction to store the first adjusted image,
wherein said second release button is further manipulable from the second image adjusting position to a second photographing position to give a second photographing instruction to store the second adjusted image,
wherein the first button and the second button are separate from one another,
wherein the first object image adjusting mode is a mode for photographing an object at a long distance, and
wherein the second object image adjusting mode is a mode for photographing an object at a short distance.

2. The photographing object image adjusting apparatus according to claim 1, wherein the object image adjusting device includes a focus adjusting device configured to control a driving device for moving at least a part of an optical system imaging the object image on the imaging surface of the photographing element or the imaging surface of the photographing element in an axial direction of an optical axis of the optical system so that a focused condition of the object image imaged by the optical system on the imaging surface of the photographing element is adjusted in accordance with the receipt of the first image adjusting instruction or the second image adjusting instruction.

3. A photographing object image adjusting apparatus comprising:
a plurality of adjusting operation devices including a first release button manipulable to a first image adjusting position to give a first image adjusting instruction corresponding to a first object image adjusting mode and a second release button manipulable to a second image adjusting position to give a second image adjusting instruction corresponding to a second object image adjusting mode; and
an object image adjusting device configured to adjust an image of an object imaged on an imaging surface of a photographing element to achieve a first adjusted image in accordance with receipt of the first image adjusting instruction or to achieve a second adjusted image in accordance with receipt of the second image adjusting instruction,
wherein said first release button is further manipulable from the first image adjusting position to a first photographing position to give a first photographing instruction to store the first adjusted image,
wherein said second release button is further manipulable from the second image adjusting position to a second photographing position to give a second photographing instruction to store the second adjusted image,
wherein the first button and the second button are separate from one another,
wherein the plurality of adjusting operation devices includes a third release button manipulable to give a third image adjusting instruction corresponding to a third object image adjusting mode, the third object image adjusting mode being different from the first object image adjusting mode and the second object image adjusting mode,
wherein the object image adjusting device is configured to adjust the image of the object imaged on the imaging surface of the photographing element in accordance with receipt of the first image adjusting instruction, the second image adjusting instruction, or the third image adjusting instruction,
wherein the third button is separate from the first button and the second button,
wherein the first object image adjusting mode is a mode for photographing an object at a long distance,
wherein the second object image adjusting mode is a mode for photographing an object at a medium distance, and
wherein the third object image adjusting mode is a mode for photographing an object at a short distance.

4. A photographing apparatus, comprising:
an optical system configured to image an image of an object;
a plurality of adjusting operation devices including a first release button manipulable to a first image adjusting position to give a first image adjusting instruction corresponding to a first object image adjusting mode, and a second release button manipulable to a second image adjusting position to give a second image adjusting instruction corresponding to a second object image adjusting mode;
a photographing device configured to photograph the image of the object imaged on an imaging surface of the photographing device; and
an object image adjusting device configured to adjust the image of the object imaged on the imaging surface of the photographing device so as to be a first optimal image of the object in accordance with receipt of the first image adjusting instruction or a second optimal image of the object in accordance with receipt of the second image adjusting instruction,
wherein said first release button is further manipulable from the first image adjusting position to a first photographing position to give a first photographing instruction to store the first optimal image using said photographing device,
wherein said second release button is further manipulable from the second image adjusting position to a second photographing position to give a second photographing instruction to store the second optimal image using said photographing device, wherein the first button and the second button are separate from one another, wherein the first object image adjusting mode is a mode for photographing an object at a long distance, and wherein the second object image adjusting mode is a mode for photographing an object at a short distance.

5. The photographing apparatus according to claim 4, wherein the first and second object image adjusting modes correspond to distances to the object from the apparatus, respectively, and wherein the plurality of adjusting operation devices are provided on an upper surface of an accommodating case of the apparatus accommodating the photographing device and the object image adjusting device so as to be arranged in succession in a direction from a side surface of the accommodating case where an opening for the optical system is provided to an opposing surface of the accommodating case opposing the side surface of the accommodating case where the opening for the optical system is provided and so that an object image adjusting device of the plurality of object image adjusting devices corresponding to an object image adjusting mode for photographing an object at a shorter distance is positioned closer to the opposing surface of the accommodating case.

6. A photographing apparatus, comprising:

an optical system configured to image an image of an object;

a plurality of adjusting operation devices including a first release button manipulable to a first image adjusting position to give a first image adjusting instruction corresponding to a first object image adjusting mode, and a second release button manipulable to a second image adjusting position to give a second image adjusting instruction corresponding to a second object image adjusting mode;

a photographing device configured to photograph the image of the object imaged on an imaging surface of the photographing device; and an object image adjusting device configured to adjust the image of the object imaged on the imaging surface of the photographing device so as to be a first optimal image of the object in accordance with receipt of the first image adjusting instruction or a second optimal image of the object in accordance with receipt of the second image adjusting instruction, wherein said first release button is further manipulable from the first image adjusting position to a first photographing position to give a first photographing instruction to store the first optimal image using said photographing device, wherein said second release button is further manipulable from the second image adjusting position to a second photographing position to give a second photographing instruction to store the second optimal image using said photographing device, wherein the first button and the second button are separate from one another, wherein the plurality of adjusting operation devices includes a third release button manipulable to give a third image adjusting instruction corresponding to a third object image adjusting mode, the third object image adjusting mode being different from the first object image adjusting mode and the second object image adjusting mode, wherein the object image adjusting device is configured to adjust the image of the object imaged on the imaging surface of the photographing element in accordance with receipt of the first image adjusting instruction, the second image adjusting instruction, or the third image adjusting instruction, wherein the third button is separate from the first button and the second button, wherein the first object image adjusting mode is a mode for photographing an object at a long distance, wherein the second object image adjusting mode is a mode for photographing an object at a medium distance, and wherein the third object image adjusting mode is a mode for photographing an object at a short distance.

7. A method of adjusting an image of a photographing object, comprising the steps of:

detecting one of:

a manipulation operation of a first release button to a first image adjusting position to give a first image adjusting instruction corresponding to a first object image adjusting mode and a further manipulation operation of the first release button from the first image adjusting position to a first photographing position to give a first photographing instruction, and a manipulation operation of a separate second release button to a first image adjusting position to give a second image adjusting instruction corresponding to a second object image adjusting mode and a further manipulation operation of the second release button from the first image adjusting position to a first photographing position to give a second photographing instruction;

adjusting the image of the photographing object to achieve one of:

a first adjusted image in response to the first image adjusting instruction when the manipulation operation of the first release button has been detected in the detecting step, and a second adjusted image in response to the second image adjusting instruction when the manipulation operation of the second release button has been detected in the detecting step; and storing one of:

the first adjusted image in response to the first photographing instruction when the further manipulation operation of the first release button has been detected in the detecting step, and the second adjusted image in response to the second photographing instruction when the further manipulation operation of the second release button has been detected in the detecting steps, wherein a range of distance in which the focus can be adjusted is different between the first object image adjusting mode used for photographing an object at a long distance and the second object image adjusting mode used for photographing an object at a short distance.

8. The method according to claim 7, wherein the focus adjusting step includes the steps of:

reading evaluation values of image signals obtained from a photographing element while moving a focusing lens in a range of distance in which the focus can be adjusted and determining if a focused position exists; and adjusting the focus, when it is determined in the focused position determining step that the focused position exists, at the focused position, and when it is determined in the focused position determining step that the focused position does not exist, at a predetermined fixed position.

9. The method according to claim 8, wherein the predetermined fixed position the focus is adjusted when it is determined in the focused position determining step that the focused position does not exist is longer when the manipulation operation of the first release button has been detected in the detecting step than when the manipulation operation of the second release button has been detected in the detecting step.

10. A method of adjusting an image of a photographing object, comprising the steps of:
    detecting one of:
        a manipulation operation of a first release button to a first image adjusting position to give a first image adjusting instruction corresponding to a first object image adjusting mode and a further manipulation operation of the first release button from the first image adjusting position to a first photographing position to give a first photographing instruction, and
        a manipulation operation of a separate second release button to a first image adjusting position to give a second image adjusting instruction corresponding to a second object image adjusting mode and a further manipulation operation of the second release button from the first image adjusting position to a first photographing position to give a second photographing instruction;
    adjusting the image of the photographing object to achieve one of:
        a first adjusted image in response to the first image adjusting instruction when the manipulation operation of the first release button has been detected in the detecting step, and
        a second adjusted image in response to the second image adjusting instruction when the manipulation operation of the second release button has been detected in the detecting step; and
    storing one of:
        the first adjusted image in response to the first photographing instruction when the further manipulation operation of the first release button has been detected in the detecting step, and
        the second adjusted image in response to the second photographing instruction when the further manipulation operation of the second release button has been detected in the detecting step,
    the method further comprising the step of:
    adjusting a diaphragm for photographing an object at a long distance when the manipulation operation of the first release button has been detected in the detecting step, or adjusting the diaphragm for photographing an object at a short distance when the manipulation operation of the second release button has been detected in the detecting step,
    wherein the diaphragm adjusting step includes the steps of:
    determining if it is necessary to perform photographing with strobe illumination; and
    adjusting the diaphragm to be set, when it is determined in the strobe illumination determining step that photographing with strobe illumination is not necessary, at a calculated diaphragm value, and when it is determined in the strobe illumination determining step that photographing with strobe illumination is necessary, in an opened condition when the manipulation operation of the first release button has been detected in the detecting step, or at a small diaphragm value when the manipulation operation of the second release button has been detected in the detecting step.

* * * * *